(12) United States Patent
Adachi et al.

(10) Patent No.: US 8,013,961 B2
(45) Date of Patent: Sep. 6, 2011

(54) LIQUID CRYSTAL DISPLAY DEVICE

(75) Inventors: Masaya Adachi, Hitachi (JP); Miharu Otani, Yokohama (JP); Jun Tanaka, Kawasaki (JP)

(73) Assignee: Hitachi Displays, Ltd., Chiba (JP)

( * ) Notice: Subject to any disclaimer, the term of this patent is extended or adjusted under 35 U.S.C. 154(b) by 103 days.

(21) Appl. No.: 12/388,554

(22) Filed: Feb. 19, 2009

(65) Prior Publication Data
US 2009/0225260 A1 Sep. 10, 2009

(30) Foreign Application Priority Data

Mar. 4, 2008 (JP) ................................. 2008-052858

(51) Int. Cl.
G02F 1/1335 (2006.01)
G02F 1/1343 (2006.01)
(52) U.S. Cl. ........................................ 349/114; 349/144
(58) Field of Classification Search .................. None
See application file for complete search history.

(56) References Cited

U.S. PATENT DOCUMENTS

| | | | |
|---|---|---|---|
| 6,657,695 B1 | 12/2003 | Song et al. | |
| 2004/0165129 A1* | 8/2004 | Okumura | 349/114 |
| 2004/0233359 A1* | 11/2004 | Nam et al. | 349/114 |
| 2005/0231666 A1 | 10/2005 | Kim et al. | |
| 2006/0072049 A1* | 4/2006 | Song | 349/43 |
| 2006/0114396 A1 | 6/2006 | Choi | |
| 2006/0132684 A1* | 6/2006 | Tanaka | 349/114 |
| 2007/0024789 A1 | 2/2007 | Itou et al. | |
| 2007/0040976 A1* | 2/2007 | Lee et al. | 349/134 |
| 2007/0064193 A1* | 3/2007 | Kurasawa | 349/155 |
| 2007/0097298 A1* | 5/2007 | Maeda | 349/114 |
| 2008/0002116 A1* | 1/2008 | Son et al. | 349/114 |
| 2008/0143939 A1 | 6/2008 | Adachi et al. | |
| 2008/0246908 A1* | 10/2008 | Lee et al. | 349/144 |

FOREIGN PATENT DOCUMENTS

| | | |
|---|---|---|
| JP | 2001-194671 | 7/2001 |
| JP | 2005-250430 | 9/2005 |
| JP | 2007-034151 | 2/2007 |
| JP | 2008-151817 | 7/2008 |

OTHER PUBLICATIONS

Office Action in Japanese Patent Application 2001-194671, dated Mar. 12, 2002 (in Japanese) [2 pages].

* cited by examiner

*Primary Examiner* — Tina M Wong
(74) *Attorney, Agent, or Firm* — Antonelli, Terry, Stout & Kraus, LLP.

(57) ABSTRACT

An object of the present invention is to implement a bright liquid crystal display device having a high contrast ratio and a wide viewing angle. A liquid crystal display device according to the present invention has: a number of data lines; gate lines formed so as to cross the number of data lines; a number of switching elements formed in locations where the number of data lines and the number of gate lines cross; a reflection area and a transmission area formed within each pixel; a liquid crystal layer sandwiched between first and second substrates; a common electrode placed between the first substrate and the liquid crystal layer; and a pixel electrode placed between the second substrate and the liquid crystal layer, and the common electrode has slits or protrusions, and the data lines overlap the slits in the common electrode or protrusions of the common electrode in the direction of normal to a surface of the first substrate in the configuration.

19 Claims, 18 Drawing Sheets

LIQUID CRYSTAL DISPLAY DEVICE

The present application claims priority over Japanese Application JP2008-52858 filed on Mar. 4, 2008, the content of which is hereby incorporated into this application by reference.

BACKGROUND OF THE INVENTION (1) Field of the Invention

The present invention relates to a liquid crystal display device.

(2) Related Art Statement

Display devices are a medium for transmitting information visually to people and play an important role for people and groups in the modern information society. The performance of liquid crystal display devices has significantly increased in recent years, and liquid crystal display devices have been adopted as display devices for cellular phones, personal computers and large screen televisions. Liquid crystal display devices are generally formed of a liquid crystal display panel and a backlight (illumination device) that is placed on the rear side of the liquid crystal display panel and illuminates the liquid crystal display panel with light. In the case where a color image is displayed, each pixel is formed of three sub-pixels that correspond to the three primary colors of red, blue and green, for example, and the sub-pixels that correspond to the respective colors are controlled independently so that various colors are reproduced.

Transflective liquid crystal display devices are used as the liquid crystal display devices in mobile devices, such as cellular phones, because they are compatible with various environments for illumination. Transflective liquid crystal display devices have a transmission area and a reflection area within each sub-pixel that forms the display area of the liquid crystal display panel. The transmission area allows a transmissive display to be gained by controlling the amount of transmitted light from the backlight. Meanwhile, reflective displays are gained by controlling the amount of reflected light from the outside in the reflection area. That is to say, transflective liquid crystal display devices primarily provide a transmissive display in a dark environment and a reflective display in a bright environment so that the visibility of display images can be secured, and thus it becomes possible to use the transflective liquid crystal display device in various environments for illumination.

A VA (vertical alignment) system is known as a system for gaining a transflective liquid crystal display device. This has a pair of transparent substrates, a liquid crystal layer sandwiched between these transparent substrates, and a pair of circular polarizers, each of which is provided on the surface of the transparent substrate on the side opposite the liquid crystal layer, and the amount of transmitted light and reflected light is controlled by changing the state of polarization of light that enters into the liquid crystal layer so that an image is displayed. In conventional transflective liquid crystal display devices in a VA system, circular polarizers are used, and the performance of these circular polarizers determines the contrast ratio of the image.

In circular polarizers, a polarizer which functions to absorb a predetermined linearly polarized light component and allows linearly polarized light perpendicular to this component to transmit and a quarter-wave plate are layered on top of each other. In order to increase the performance of the circular polarizer, it becomes necessary to use a quarter-wave plate of which the wavelength dependency on retardation is small, and furthermore to layer the quarter-wave plate and the polarizer precisely on top of each other so that the slow axis of the quarter-wave plate and the absorption axis of the polarizer form a predetermined angle. In actual mass production, however, there is inconsistency in the retardation of the quarter-wave plate and the angle between the slow axis of the quarter-wave plate and the absorption axis of the polarizer, and therefore such a problem arises in that it is difficult to increase the contrast ratio on the transmissive display in transflective liquid crystal display devices having a circular polarizer. That is to say, a system that does not use a circular polarizer is desirable in order to increase the contrast ratio of the transmissive display in a transflective liquid crystal display device in a VA system.

Patent Document 1 describes a liquid crystal display device in a VA system that does not use a circular polarizer. This is provided with another polarization layer in addition to a pair of polarizers that form a liquid crystal display device so that the pixel electrodes and the metal reflective layer are coated. The pair of polarizers are placed in such a manner that the absorption axes are perpendicular to each other, and the absorption axis of the polarization layer coincides with the absorption axis of the polarizer provided on the backlight side. In this case, the transmissive display is of a so-called normally black type where it becomes black (dark) in the case where the driving voltage is zero and becomes bright when a driving voltage is applied. Meanwhile, a reflective display of a normally black type where it becomes a black (dark) display in the case where the driving voltage is zero and a bright display when a driving voltage is applied can be implemented in the same manner as the transmissive display by making the metal reflective layer connected to the pixel electrodes a reflection area. That is to say, a transflective liquid crystal display device in a VA system can be implemented without using a circular polarizer.

Here, Patent Document 1 describes that a TCF (thin crystal film) made by OPTIVA, Inc., is used as the material for the polarization layer. That is to say, a coating type material is used for the polarization layer.

[Patent Document 1] Japanese Unexamined Patent Publication 2005-250430

SUMMARY OF THE INVENTION

Problem to be Solved by the Invention

In liquid crystal display devices in a VA system that do not use a circular polarizer, the contrast ratio can be prevented from lowering due to the quarter-wave plate that forms the circular polarizer. In this case however, the area where liquid crystal molecules that would contribute to the brightness of the display when a circular polarizer is used in the transmission area are directed parallel or perpendicular to the absorption axis of the polarizer does not contribute to the brightness of the display.

In addition, liquid crystal display devices in a VA system are provided with protrusions or slits in the electrodes in order to provide a wide viewing angle so that liquid crystal molecules incline in a number of directions when an electric field is applied to the liquid crystal layer. The protrusions and the slits in the electrodes for regulating the direction in which the liquid crystal molecules incline do not contribute to the brightness of the display because the liquid crystal molecules barely move even when an electric field is applied to the liquid crystal layer. Furthermore, in the case where protrusions for regulating the direction in which liquid crystal molecules incline are provided, the liquid crystal molecules incline along the inclined surfaces of the protrusions even when no electric field is applied to the liquid crystal layer, and this allows light to escape, and thus is a factor in the contrast ratio lowering.

An object of the present invention is to implement a bright liquid crystal display device having a high contrast ratio and a wide viewing angle.

Means for Solving Problem

In order to achieve the above described object, the present invention provides a liquid crystal display device, having: a number of data lines; gate lines formed so as to cross the number of data lines; a number of switching elements formed in locations where the number of data lines and the number of gate lines cross; a reflection area and a transmission area formed within each pixel; a liquid crystal layer sandwiched between first and second substrates; a common electrode placed between the first substrate and the liquid crystal layer; and a pixel electrode placed between the second substrate and the liquid crystal layer, characterized in that the common electrode has slits or protrusions, and the data lines overlap the slits in the common electrode or protrusions of the common electrode in the direction of normal to a surface of the first substrate.

In addition, the present invention provides a liquid crystal display device, having: a number of data lines; gate lines formed so as to cross the number of data lines; a number of switching elements formed in locations where the number of data lines and the number of gate lines cross; a reflection area and a transmission area formed within each pixel; a liquid crystal layer sandwiched between first and second substrates; a common electrode placed between the first substrate and the liquid crystal layer; and a pixel electrode placed between the second substrate and the liquid crystal layer, characterized in that the pixel electrode has slits or protrusions, and the data lines overlap the slits in the pixel electrode or protrusions of the pixel electrode in the direction of normal to a surface of the first substrate.

In addition, the present invention provides a liquid crystal display device, having: a number of data lines; gate lines formed so as to cross the number of data lines; a number of switching elements formed in locations where the number of data lines and the number of gate lines cross; a reflection area and a transmission area formed within each pixel; a liquid crystal layer sandwiched between first and second substrates; a common electrode placed between the first substrate and the liquid crystal layer; and a pixel electrode placed between the second substrate and the liquid crystal layer, characterized in that the common electrode has protrusions, the pixel electrode has slits, the data lines overlap the slits in the pixel electrode in the direction of normal to a surface of the first substrate, and the reflective layer overlaps the protrusions of the common electrode in the direction of normal to a surface of the first substrate.

Effects of the Invention

A bright liquid crystal display device having a high contrast ratio and a wide viewing angle can be implemented.

EXPLANATIONS OF SYMBOLS

Figure 1:
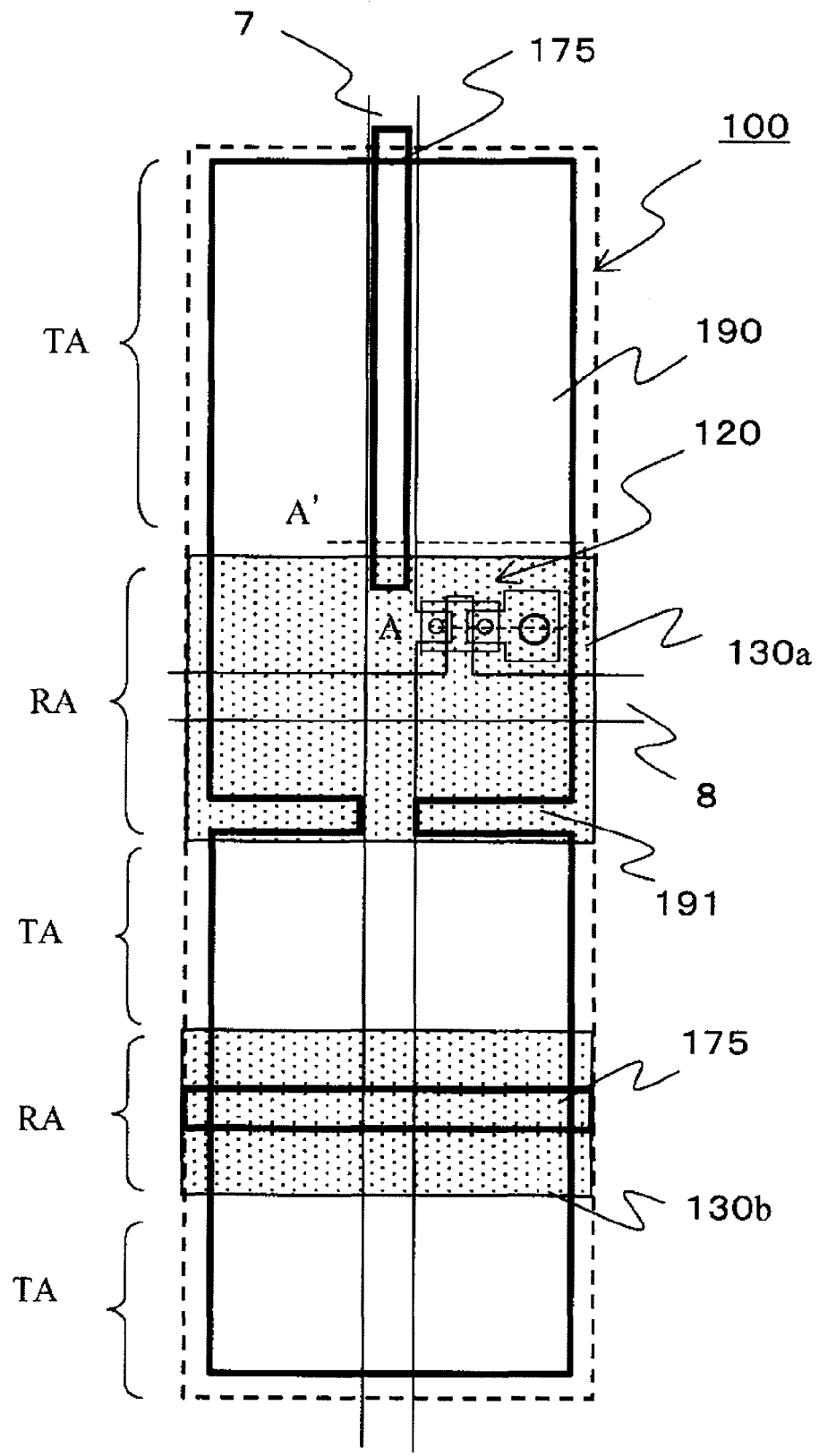
FIG. 1 is a plan diagram schematically showing the configuration of a main portion of a (sub) pixel of the liquid crystal display panel in the liquid crystal display device according to the present invention.

1 . . . liquid crystal display panel
2 . . . display area
3 . . . data driver circuit
4 . . . scan driver circuit
5 . . . backlight
7, 7a, 7b, 7c . . . data lines
8 . . . gate line
50 . . . FPC
60 . . . light guiding body
61 . . . light source
62 . . . reflective sheet
63 . . . optical film
100, 100a, 100b, 100c . . . sub-pixels
110 . . . first transparent substrate
111 . . . second transparent substrate
120 . . . switching element
121 . . . semiconductor layer
122 . . . gate insulating layer
123 . . . gate electrode
124 . . . first interlayer insulating layer
125A, 125B . . . electrode layer
126 . . . second interlayer insulating layer
127 . . . insulating layer
130 . . . reflective layer
140 . . . flattened layer
150 . . . polarization layer
170 . . . common electrode
175 . . . slit in common electrode
190 . . . pixel electrode
191 . . . slit in pixel electrode
195 . . . through hole
200 . . . liquid crystal layer
210 . . . first polarizer
211 . . . second polarizer
220 . . . protrusion of common electrode
225 . . . protrusion of pixel electrode
TA . . . transmission area
RA . . . reflection area

DETAILED DESCRIPTION OF THE INTENTION

Best Mode for Carrying Out the Invention

In the following, the embodiments of the present invention are described in reference to the drawings in which various modifications are possible, and in addition combinations of the following embodiments are included in the present invention.

First Embodiment

FIG. 1 is a plan diagram schematically showing the configuration of a main portion of a sub-pixel 100 of the liquid crystal display panel in the transflective liquid crystal display device according to the present invention. Here, a case is shown where one pixel is formed of three sub-pixels corresponding to three primary colors: red, blue and green, in order to provide a color display, and therefore the expression "sub-pixel" is used for the unit of the area where the brightness can be controlled independently. Therefore, in the case of a unit of area where the brightness can be controlled independently being defined as a pixel, a pixel and a sub-pixel basically mean the same thing.

Figure 2:
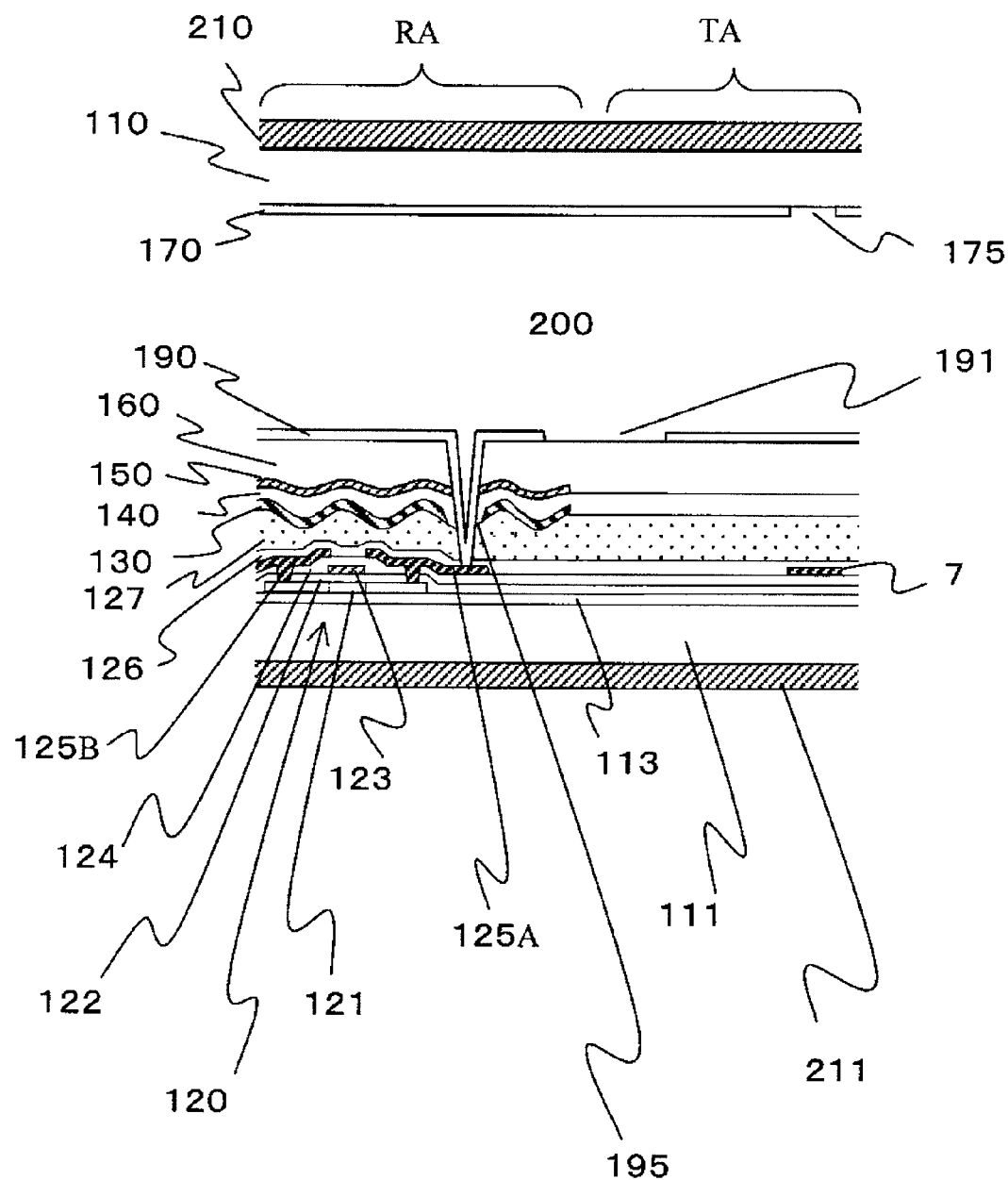
FIG. 2 is a cross sectional diagram schematically showing the configuration of a main portion of a (sub)pixel of the liquid crystal display panel in the liquid crystal display device according to the present invention.

FIG. 2 is a cross sectional diagram schematically showing the configuration of a main portion of a sub-pixel 100 of the liquid crystal display panel in the transflective liquid crystal display device according to the present invention. Here, FIG. 2 is a cross sectional diagram schematically showing the structure along line A-A' in FIG. 1.

Figure 3:
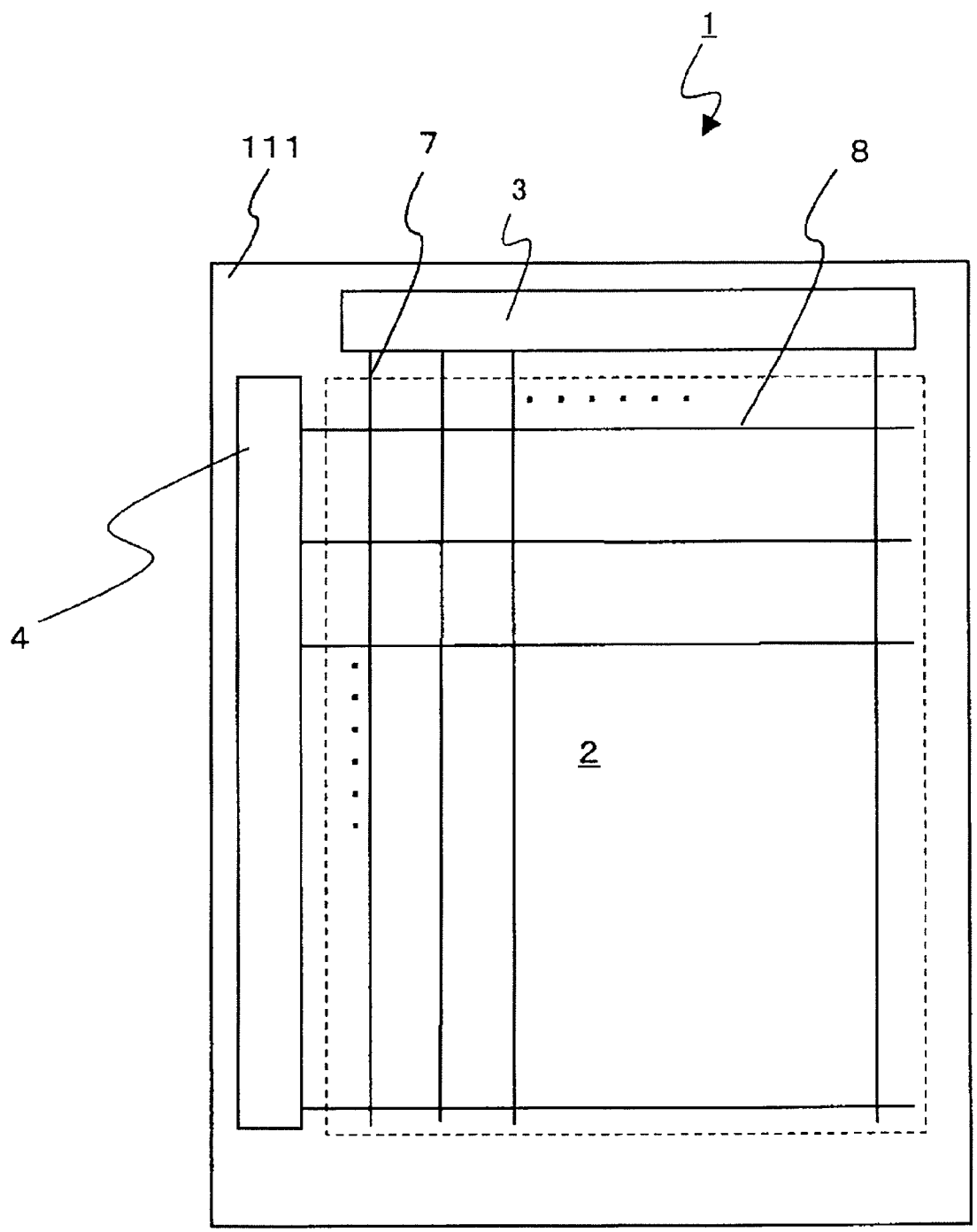
FIG. 3 is a block diagram schematically showing an example of the layout of the entire liquid crystal display panel in the liquid crystal display device according to the present invention.

In addition, FIG. 3 is a block diagram schematically showing an example of the layout of the entire liquid crystal display panel 1 in the transflective liquid crystal display device according to the present invention, and as shown in FIG. 3, the liquid crystal display panel 1 is provided with a display area 2 in an area of the second transparent substrate 111 that includes the center portion. A data driver circuit 3 for outputting an image signal to data lines (signal lines) 7 is provided on the upper side of the display area 2, and a scanning driver circuit 4 for outputting a scanning signal to gate lines (scan lines) 8 is provided on the left. The data driver circuit 3 and the scan driver circuit 4 are formed of a shift register circuit, a level shifter circuit and an analog switch circuit formed of complementary circuits using N channel and P channel thin film transistors (TFT's). The liquid crystal display panel 1 is provided with a number of gate lines 8 and a number of data lines 7 which extend in the direction crossing the direction in which the gate lines 8 extend, and sub-pixels 100 are placed in a matrix at intersections between the gate lines 8 and the data lines 7. In addition, as shown in FIGS. 1 and 2, sub-pixels 100 of the liquid crystal display panel according to the present invention have a transmission area TA and a reflection area RA within each sub-pixel 100.

As shown in FIG. 2, the liquid crystal display panel according to the present invention has a first transparent substrate 110 and a second transparent substrate 111, which have insulation properties and are made of flat, transparent and optically isotropic transparent bodies, and a liquid crystal layer 200 between these substrates. Glass is generally used for the first transparent substrate 110 and the second transparent substrate 111, and a polymer film, of which the resistance to heat and durability have been improved, can also be used to satisfy the above described requirements.

The first transparent substrate 110 is provided with a common electrode 170 made of a transparent conductive material which has an opening, that is a slit, in order to define the direction in which liquid crystal molecules incline when an electric field is applied to the liquid crystal layer (hereinafter referred to as slit 175 in the common electrode). The common electrode 170 is formed of a transparent conductive material. ITO (indium tin oxide) is appropriate for the common electrode 170, and other transparent conductive materials, such as InZnO and ZnO, can also be used.

The slit 175 in the common electrode is provided in such a location as to overlap a data line 7 formed on the second substrate 110 because of the following reasons.

The first transparent substrate 110 is provided with a color filter and an alignment layer (neither is shown) in addition to the common electrode 170. The color filter is provided between the transparent substrate 110 and the common electrode 170. Color filters are used to transmit colors carried by individual sub-pixels 100, for example, three primary colors which are added when mixed: red, green and blue, three primary colors which are subtracted when mixed: yellow, magenta and cyan, or other desired colors for sub-pixels: bluish-green and yellowish-green. In addition, light from the outside passes through the color filters twice in the reflection area RA, and therefore the color darkness, thickness and the area covered may be different between the reflection area EA and the transmission area TA. The alignment layer is provided on the surface of the common electrode 170 on the liquid crystal layer 200 side. The alignment layer functions to align the longitudinal axes of the liquid crystal molecules in the liquid crystal layer 200 in the direction perpendicular to the surface of the first substrate 110, and a polyimide based polymer can be used, for example.

The second transparent substrate 111 is provided with switching elements 120. The switching elements 120 are formed of thin film transistors having a semiconductor layer made of polysilicon, amorphous silicon or an organic substance in such locations that a number of data lines 7 and a number of gate lines 8 cross. Here, though a case of a thin film transistor made of polysilicon is described as an example, the present invention is not limited to this. The switching elements 120 formed of polysilicon thin film transistors have a gate insulating layer 122, gate electrodes 123, a first interlayer insulating layer 124, an electrode layer 125A, an electrode layer 125B and a second interlayer insulating layer 126 above a polysilicon layer that includes semiconductor layers 121 which become source/drain regions and channel regions.

The gate insulating layer 122 and the first interlayer insulating layer 124 are made of SiOx (silicon oxide), for example, and the second interlayer insulating layer is made of SiNx (silicon nitride), for example.

A metal electrode material may be used for the electrode layer 125A, the electrode layer 125B and the data lines 7, and a film having a three layer structure where an aluminum layer is sandwiched between titanium (Ti) or tungsten (w) from the top and the bottom can be used, for example; however, the invention is not limited to this. The electrode layer 125A and the electrode layer 125B are respectively connected to the source regions and the drain regions in the semiconductor layer 121 through openings created in the first interlayer insulating layer 124.

Here, a base layer 113 may be provided between the switching elements 120 and the second transparent substrate 111 in order to block ions, such as Na and K, so that they do not mix into the semiconductor layer 121 or the gate insulating layer 122 from the transparent substrate 111. The base layer 113 has a multilayer structure where a layer made of SiNx or the like and a layer made of SiOx or the like are layered in this order from the second transparent substrate 111 side.

An insulating layer 127 is provided on top of the switching elements 120. This insulating layer 127 functions to flatten the surface over steps due to the switching elements 120, wires and the like, and to provide unevenness to the surface of the below described reflective layer 130.

It is desirable to use a material that can form a layer in a solution state in order to flatten the surface over steps. Accordingly, an organic substance based material or an inorganic material that is dispersed in a solvent so that film formation becomes possible through application can be used for the insulating layer 127. Furthermore, the insulating layer 127 requires a process for making the surface uneven, and therefore in the case where the material has photosensitive properties, this is advantageous in simplifying the process. In addition, the insulating layer 127 transmits light from the backlight efficiently in the transmission area TA, and therefore a transparent material that seldom absorbs visible light is desirable. Accordingly, an organic material, such as photosensitive polyimide, or an acryl based resin is desirable for the insulating film 127.

The surface of the insulating layer 127 is made uneven in order to make the surface of the reflective layer 130 uneven in the reflection area RA. This unevenness may be provided by raising the temperature so as to melt the material after the formation of an uneven pattern in accordance with a photolithographic technology, or may be provided using a half-tone mask in the process for light exposure. Meanwhile, the surface of the insulating layer 127 is flat in the transmission area TA.

A reflective layer 130 is formed on top of the insulating layer 127 in portions corresponding to the reflection area RA metal material having high reflectance, such as aluminum or silver, may be used for the reflective layer 130. The reflective layer 130 is removed from the transmission area TA in accordance with a photolithographic technology or the like. Here, the surface of the reflective layer 130 becomes uneven, reflecting the unevenness on the surface of the insulating layer 127 beneath the reflective layer. The unevenness on the reflective layer 130 causes angles at which light entering from the outside into the liquid crystal display panel is reflected from the reflective layer 130 to range widely, and thus the display becomes brighter as a result of reflection when used.

A flattened layer 140 is provided on top of the reflective layer 130 if necessary. The flattened layer 140 is a layer to prevent the optical performance of the polarization layer 150 formed above the reflective layer 130 from deteriorating due to the unevenness of the reflective layer 130. That is to say, this is a layer for flattening the base surface on which the polarization layer 150 is formed. The optical performance of the polarization layer 130 is prevented from deteriorating when this flattening layer 140 is provided, and this can contribute to an image display that is brighter and has a higher contrast ratio.

It is desirable to form the flattened layer 140 of an insulating material that is a transparent material that makes layer formation possible in a solution state and seldom absorbs visible light. That is to say, an organic material, such as a polyimide based resin or an acryl based resin, is desirable in the same manner as for the insulating film 127.

A polarization layer 150 is formed as a layer above the reflective layer 130. At this time, as described above, a flattened layer 140 may be provided between the reflective layer 130 and the polarization layer 150 if necessary. The polarization layer 150 absorbs linearly polarized light having a vibration plane in a predetermined actual direction and transmits linearly polarized light having a vibration plane in the direction perpendicular to this axis. The polarization layer 150 can be formed using the lyotropic liquid crystal dye described in "Y. Ukai et al, 'Current Status and Future Prospect of In-Cell Polarizer Technology,' SID 04 DIGEST, pp. 1170-1173, 2004" and "Ir Gvon Khan et al., 'Ultra-Thin O-Polarizers' Superiority over E-Polarizers for LCDs,' SID 04 DIGEST, pp. 1316-1319, 2004", for example, and applying it. In the case where the material described in "Y. Ukai et al., 'Current Status and Future Prospect of In-Cell Polarizer Technology,' SID 04 DIGEST, pp. 1170-1173, 2004" is used, for example, a slit dye coater may be used for the application of the polarization layer 150. The slit dye coater can allow the material for the polarization layer 150 in a solution state to be supplied to the application surface and to be spread in the direction of application while applying pressure to the material. This process allows the dye to be oriented and secured, and thus a polarization layer 150 can be formed. In this case, the absorption axis of the polarization layer is in the direction perpendicular to the direction of application. Here, a material that exhibits polarizing properties when irradiated with linearly polarized light may be used for the polarization layer 150.

It is desirable for the polarization layer 150 not to be formed in the transmission area TA because of the below described reasons. Therefore, a case where the polarization layer 150 is not formed in the transmission area TA is described in the present embodiment.

Figure 13:
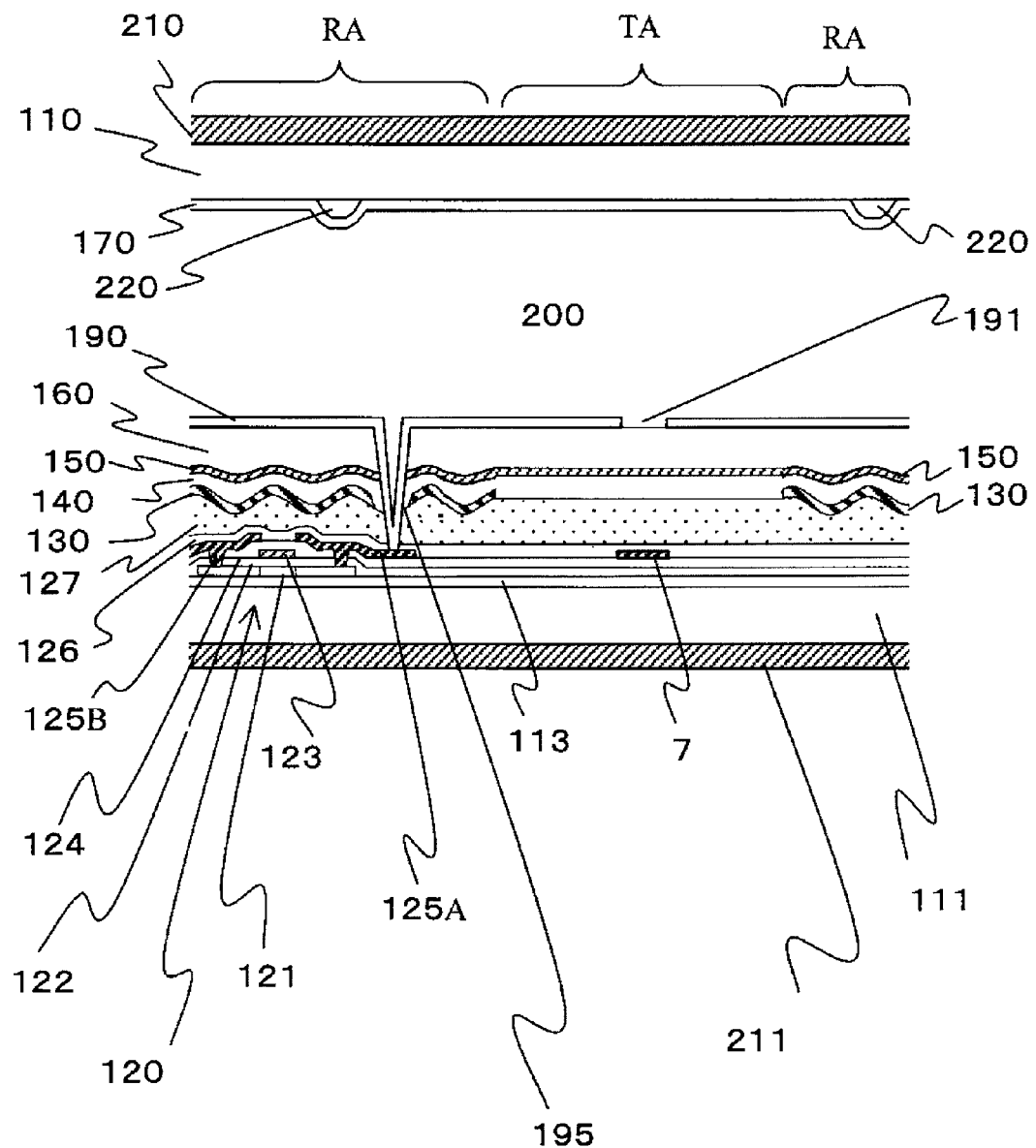
FIG. 13 is a cross sectional diagram schematically showing the configuration of a main portion of a (sub)pixel of the liquid crystal display panel in the liquid crystal display device according to the present invention.

Here, though the polarization layer 150 is not formed in the transmission area TA in the present embodiment, there may be cases where a polarization layer is formed in the transmission area TA according to other embodiments as described in reference to FIG. 13.

That is to say, the effects of the present invention can be gained irrelevant of the place where the polarization layer 150 is located. The polarization layer 150 may be formed between the liquid crystal layer 200 and the pixel electrode 190.

A pixel electrode 190 is formed in a layer portion located above the polarization layer 150 in both the reflection area RA and the transmission area TA. At this time, a protective layer 160 may be provided between the polarization layer 150 and the pixel electrode 190 if necessary.

The protective layer 160 may be provided in a process after the formation of the polarization layer 150 in order to prevent the polarization layer 150 from deteriorating or to prevent an impurity from oozing out from the polarization layer 150 and contaminating other structures. The protective layer 160 may be made of a material transparent to visible light, and a polyimide based or an acryl based transparent resin material or a transparent inorganic material, such as SiOx (silicon oxide) or SiNx (silicon nitride), can be used. SiNx that can form a dense layer is desirable in the case where the protective layer requires a particularly high performance.

Here, in the case where the polarization layer 150 is removed from the transmission area TA in accordance with a photolithographic technology, for example, a transparent photosensitive resist material is used as the resist material, and this resist material is left on the polarization layer 150 in the reflection area RA even after the removal of the polarization layer 150 from the transmission area TA so that this resist material can be used as the protective film 160. In this case, such effects can be gained that the number of steps can be reduced.

It is desirable for the pixel electrode 190 to be formed of a transparent conductive material, and it is preferable to use ITO (indium tin oxide), for example, in the same manner for the common electrode 170, and other transparent conductive materials, such as InZnO or ZnO, can also be used. In addition, the pixel electrode 190 is connected to the electrode layer 125A that forms the switching element 120 via the opening (through hole) 195 that penetrates through the protective layer 160, the polarization layer 150, the flattening layer 140, the reflective layer 130, the insulating layer 127 and the insulating layer 126. The through hole 195 is directly filled in with the same conductive material as that of the pixel electrode. Alternatively, a middle layer made of a conductive material not shown, may be provided in order to ensure electrical connection between the electrode layer 125A and the electrode material that forms the pixel electrode 190.

In the case where the reflective layer 130 is made of a conductive material, an opening is provided in the location corresponding to the through hole 195 so that the reflective layer can be completely separated from the pixel electrode in order to prevent the reflective layer from making contact with the pixel electrode 190 in the through hole 195.

As shown in FIGS. 1 and 2, the pixel electrode 190 is provided with an opening, which is a slit, in the space between the pixel electrode and the adjacent sub-pixel 100 and within one sub-pixel 100 (hereinafter referred to as slit in the pixel electrode 191). In addition, the electrode layer 125B is connected to the data line 7 and the gate electrode 123 is connected to the gate line 8, and the electrode layer 125B may be provided as part of the data line 7 and the gate electrode 123 may be provided as part of the gate line 8.

An alignment layer (not shown) is formed on top of the pixel electrodes 190 so that they are covered. A polyimide based polymer can be used as the alignment layer in the same manner as the alignment layer formed on the first transparent substrate 110.

The surfaces of the first transparent substrate 110 and the second transparent substrate 111 on which the alignment layer is formed face each other in such a state that a constant gap is provided by means of spacers, not shown, and the periphery is adhered with a sealing material so that a space is created inside. This space is filled in with nematic liquid crystal having a negative dielectric anisotropy which is then sealed, and thus a liquid crystal layer 200 is provided. The direction of alignment of the longitudinal axis of the liquid crystal molecules in the liquid crystal layer 200 is perpendicular to the surfaces of the first substrate 110 and the second substrate 111 as a result of an alignment process carried out on the alignment layers formed on the first transparent substrate 110 and the second transparent substrate 111. That is to say, the liquid crystal layer 200 has a so-called homeotropic alignment.

The thickness d of the liquid crystal layer 200 is set so as to provide such conditions that the retardation becomes ½ wavelength in the case where the liquid crystal molecules are observed in the direction perpendicular to the surface of the substrates when a predetermined electric field is applied to the liquid crystal layer 200, and the liquid crystal molecules incline relative to the surface of the substrates. That is to say, such a thickness d that allows the retardation $\Delta n d$ to be 275 nm for light having a wavelength of 550 nm, for examples may be selected when the anisotropy of the index of refraction of the liquid crystal material is $\Delta n$.

A first polarizer 210 and a second polarizer 211 are respectively provided on the surface of the first transparent substrate 110 and the second transparent substrate 111 on the side opposite to the liquid crystal layer 200. Films of expanded polyvinyl alcohol that have adsorbed iodine so that a polarization function can be gained where protective layers of triacetyl cellulose are provided on the two sides can be used as the first polarizer 210 and the second polarizer 211. Here, the first polarizer 210 and the second polarizer 211 may be respectively pasted to the first transparent substrate 110 and the second transparent substrate 111 with a transparent adhesive.

Figure 4:
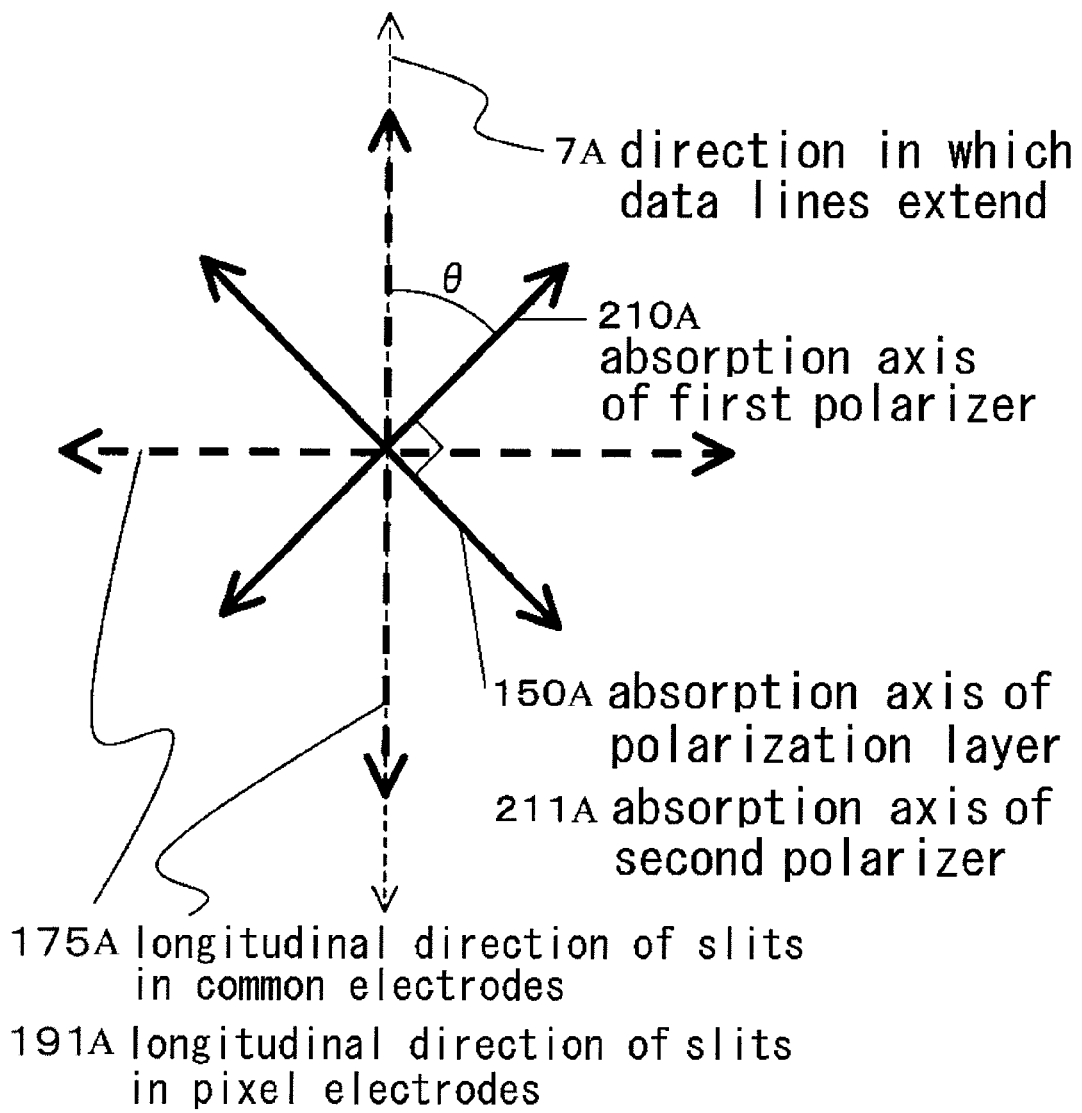
FIG. 4 is a diagram showing the relationship between optical axes of the members that form the liquid crystal display panel in the liquid crystal display device according to the present invention.

FIG. 4 is a diagram illustrating an example of the relationship between the absorption axis 210A of linearly polarized light of the first polarizer 210, the absorption axis 211A of linearly polarized light of the second polarizer 211, the absorption axis 150A of linearly polarized light of the polarization layer 150, the direction in which the data line 7 extends 7A, the longitudinal direction 191A of the slit in the pixel electrode 191 and the longitudinal direction 175A of the slit in the common electrode 175. Here, there are two directions crossing at a right angle within one sub-pixel 100 in terms of the longitudinal direction 191A of the slit in the pixel electrode 191 and the longitudinal direction 175A of the slit in the common electrode 175.

The absorption axis 210A of the first polarizer and the absorption axis 211A of the second polarizer are perpendicular to each other, and the absorption axis 150A of linearly polarized light of the polarization layer 150 is in the direction parallel to the absorption axis 211A of linearly polarized light of the second polarizer 211.

The angles θ formed between the absorption axis 210A of linearly polarized light of the first polarizer, the longitudinal direction 191A of the slit in the pixel electrode 191 and the longitudinal direction 175A of the slit in the common electrode 175 are 45° or 135°.

In the present invention, the direction in which liquid crystal molecules incline when an electric field is applied to the liquid crystal layer 200 becomes perpendicular to the slit in the pixel electrode 191 in close vicinity or the longitudinal direction 175A of the slit in the common electrode 175 in the same manner as in conventional VA system liquid crystal display devices. Therefore, the direction in which the liquid crystal molecules incline when an electric field is applied to the liquid crystal layer 200 is at 45° or 135° relative to the absorption axis 210A of linearly polarized light of the first polarizer, the absorption axis 211A of linearly polarized light of the second polarizer and the absorption axis 15A of linearly polarized light of the polarization layer 150.

Here, in the case where the material described in "Y. Ukai et al., "Current Status and Future Prospect of In-Cell Polarizer Technology", SID 04 DIGEST, p 1170-1173, 2004" is used for the polarization layer 150, for example, the direction in which it is applied may incline 45° relative to the direction in which the data lines extends.

In addition, the absorption axis 210A of linearly polarized light of the first polarizer, the absorption axis 211A of linearly polarized light of the second polarizer and the absorption axis 150A of linearly polarized light of the polarization layer 150 may be rotated together by 90° relative to the direction shown in FIG. 4.

Figure 5:
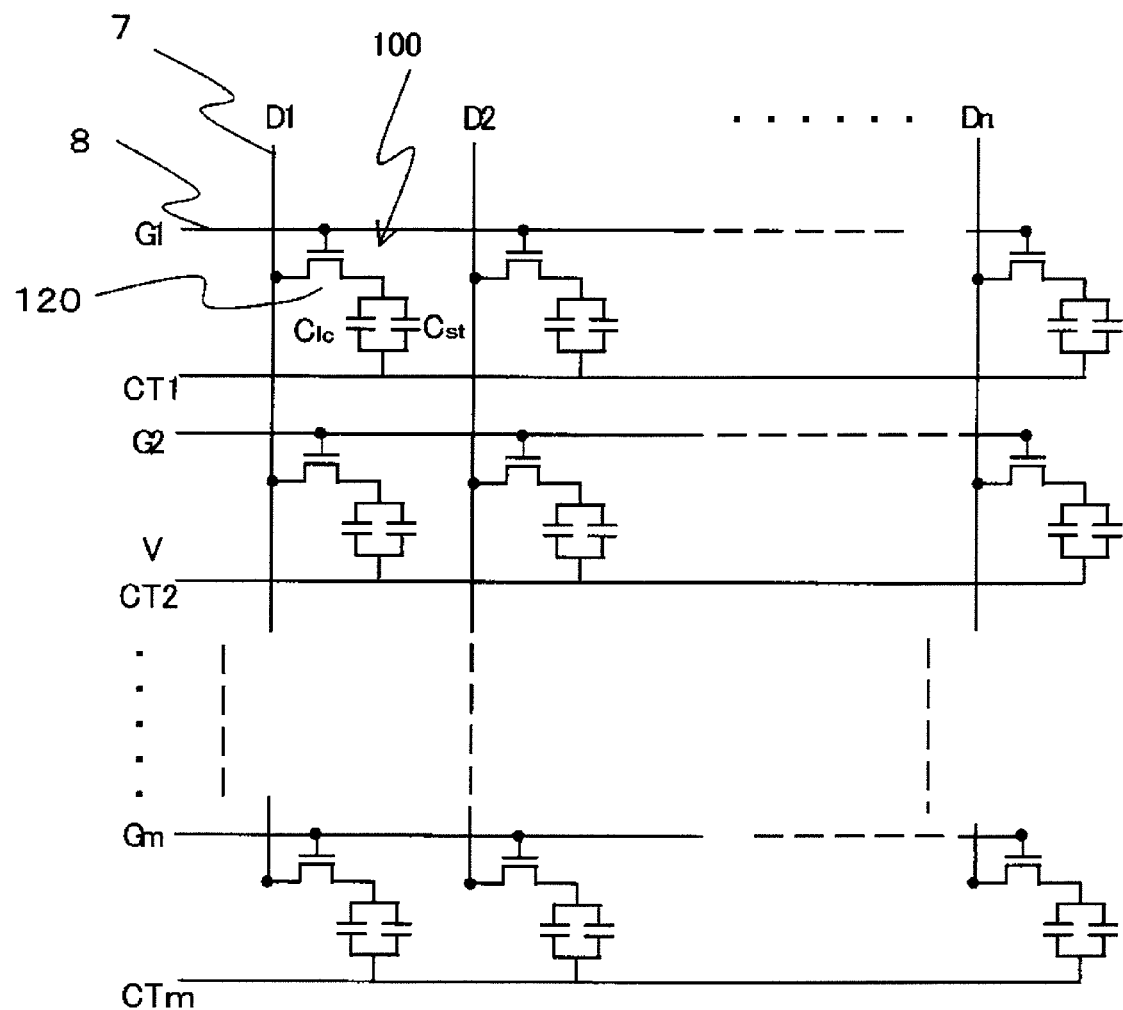
FIG. 5 is a circuit diagram equivalent to the active matrix formed in the display area 2 on the liquid crystal display panel 1 in the liquid crystal display device according to the present invention.

FIG. 5 is a circuit diagram equivalent to the active matrix formed in the display region 2 on the liquid crystal display panel 1 in the liquid crystal display device according to the present invention. The liquid crystal display panel 1 is provided with a number of gate lines and a number of data lines which extend in the direction crossing the direction in which the gate lines extend in the same manner as in conventional active matrix driver type liquid crystal display panels, and as shown in FIG. 5, sub-pixels 100 are provided in a matrix at intersections between m gate lines G1, G2 . . . Gm and n data lines D1, D2 . . . Dn. In addition, though the common electrode 170 is provided as m common electrodes CT1, CT2 . . . CTm in FIG. 5 for the sake of convenience, it is not necessary to be divided and one electrode may cover the entire surface in the display area.

As shown in the equivalent circuit diagram, each sub-pixel 100 can be formed of a capacitor element (storage capacitor) Cst formed on the second transparent substrate 111, a capacitor element Clc formed of the liquid crystal layer 200, and a switching element 120.

When sub-pixels 100 are driven, a turn on voltage is supplied in sequence starting from the gate line G1 in the first row, and this voltage (scan signal) is supplied in sequence to the gate lines in m rows within one frame period. When a switching element 120 becomes of the on state due to the scan signal, the voltage corresponding to the image signal is supplied from the data line 7 to the pixel electrode 190 via the switching element 120. That is to say, all the switching elements 120 connected to a data line become of the on state while the turn on voltage is being supplied to a certain gate line, and the data voltage is supplied to the data line in the nth column in sync with this. That is to say, the method for driving the liquid crystal display panel 1 is the same for conventional active matrix driver type liquid crystal display devices, and therefore the detailed description thereof is omitted.

Figure 6:
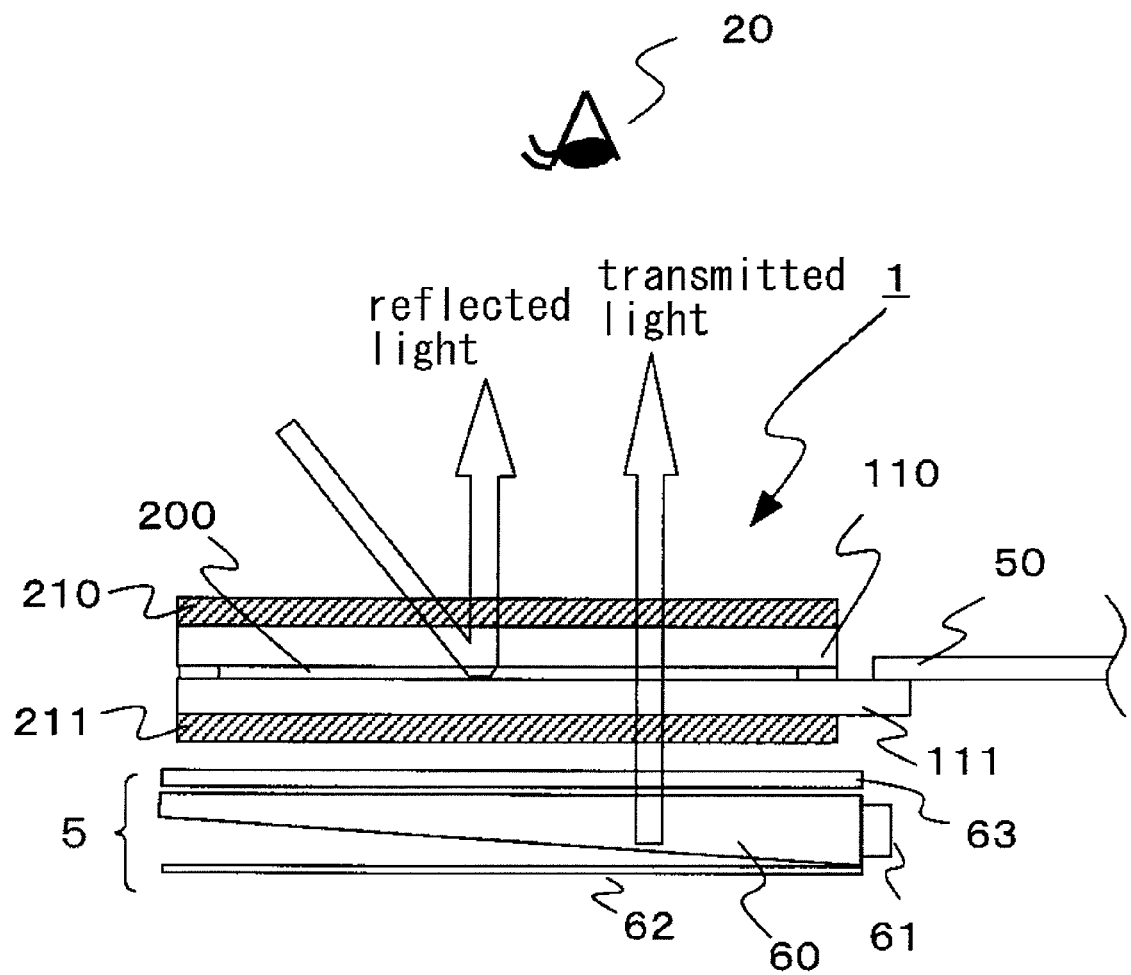
FIG. 6 is a cross sectional diagram schematically showing the configuration of a main portion in the liquid crystal display device according to the present invention.

FIG. 6 is a cross sectional diagram schematically showing the configuration of a main portion of the liquid crystal display device according to the present invention. This liquid crystal display device is formed of a liquid crystal display panel 1 and a backlight 5 provided in the rear of the liquid crystal display panel.

The liquid crystal display panel 1 has a first transparent substrate 110 and a second transparent substrate 111 as described above.

In general the second transparent substrate 111 is larger than the first transparent substrate 110 and has a region for receiving video information, such as an image signal, which is an electrical signal from the outside in the region of the second transparent substrate 111 on the surface on the first transparent substrate 110 side which is not covered with the first transparent substrate 110. That is to say, the liquid crystal display panel 1 is provided with a flexible printed circuit board (FPC) 50 in the region on the second transparent substrate 111 where the first transparent substrate 110 does not overlap and is electrically connected to the outside via this FPC 50. In addition, a semiconductor chip (not shown) which functions as a driver may be mounted in this region if necessary.

The backlight 5 illuminates the display area of the liquid crystal display panel 1 from the rear side. There are an edge light system (light guiding body system), a directly beneath system (reflective plate system), a surface light source system and the like as the backlight 5. An optimal system for the backlight 5 may be selected from among these and other systems depending on the application, purpose and size of the display area. Though an edge light system backlight is described here, the present invention is not limited to this.

The backlight 5 has: a light guiding body 60 made of a transparent resin where dots are printed with white pigment on the rear side or a means for changing the direction in which light progresses, such as microscopic unevenness or lenses, is formed; a light source 61 provided on an end surface of the light guiding body 60, a reflective sheet 62 provided on the rear side of the light guiding body 60; and an optical film 63, such as a prism sheet or a diffusion sheet, provided on the front side of the light guiding body 60.

A linear light source, such as a cold cathode ray tube or a hot cathode ray tube, or light source in dot form, such as light emitting diodes (LED's) can be used for the light source 61. Though a case where LED's are used for the light source 61 is described here, the present invention is not limited to this. In the case where LED's are used for the light source 61, a reflective body, not shown, may be provided in order for light from the light source to efficiently enter into the light guiding body 60, or the form of the molding resin provided around the light emitting portions of the LED's may be modified.

In this configuration, light emitted from the light source 61 and entering into the light guiding body 60 propagates through the light guiding body 60 while repeating the total reflection. When light propagating through the light guiding body 60 reaches the means for changing the direction in which light progresses provided on the rear side of the light guiding body, the direction in which it progresses changes, and the light emits through the front surface side of the light guiding body 60. The range of the angles at which light emits from the light guiding body 60 and the uniformity of the brightness within the surface are adjusted by means of the optical film 63, such as a prism sheet or a diffusion sheet, and after that the light illuminates the liquid crystal display panel 1.

When the light emitted from the backlight 5 that illuminates the liquid crystal display panel 1 enters into the transmission area TA, it passes through the second polarizer 211, and then passes through the liquid crystal layer 200 so as to enter into the first polarizer 200.

At this time, the driving voltage corresponding to the video information sent from a video information generating portion (not shown) is applied to the pixel electrode 190 so that there is a potential difference between the pixel electrode 190 and the common electrode 170 and an electric field is generated, and thus the direction of the liquid crystal molecules can be changed. This works to change the state of polarization of light that passes through the liquid crystal layer 200, and thus the amount of light that transmits through the first polarizer 210 can be controlled.

In the case where the driving voltage is 0V that is to say, there is no difference in the potential between the pixel electrode 190 and the common electrode 170 so that no electric field is formed, for example, the direction of alignment of liquid crystal molecules does not change, and thus the state of polarization of light that passes through the liquid crystal layer 200 is maintained. Therefore, the first polarizer 210 absorbs the light that passes through the liquid crystal layer 200 so that a black (dark) display is provided.

Meanwhile, when a predetermined driving voltage is applied to the pixel electrode 190 so that a predetermined electric field is formed between the pixel electrode 190 and the common electrode 170, the direction of liquid crystal molecules changes and the state of polarization of light that passes through the liquid crystal layer 200 changes. Therefore, as for the light that passes through the liquid crystal layer 200, the amount of light in accordance with the degree of change of the state of polarization transmits through the first polarizer 210, and thus the display has a predetermined brightness. That is to say, in the case where the driving voltage is zero, a black (dark) display is provided, whereas when a predetermined driving voltage is applied, a bright display is provided, and thus the display becomes of a so-called normally black type.

In addition, light that enters into the reflection area RA of the liquid crystal display panel 1 from the outside passes through the first polarizer 210, and after that passes through the liquid crystal layer 200 so as to enter into the polarization layer 150.

At this time, like the transmission area TA, a driving voltage corresponding to the video information transmitted from the video information generating portion (not shown) is applied to the pixel electrode 190 so that there is a difference in the potential between the pixel electrode 190 and the common electrode 170 and an electric field is formed, and thus the direction of liquid crystal molecules can be changed. As a result of these working effects, the state of polarization of light that passes through the liquid crystal layer 200 is changed so that the amount of light that transmits through the polarization layer 150 can be controlled.

In the case where the driving voltage is 0V, that is to say, there is no difference in the potential between the pixel electrode 190 and the common electrode 170 so that no electric field is formed, for example, the direction of alignment of liquid crystal molecules does not change, and thus the state of polarization of light that passes through the liquid crystal layer 200 is maintained. Therefore, the polarization layer 150 absorbs a majority of the light that passes through the liquid crystal layer 200 so that almost no light is reflected towards the observer 20, and thus a black (dark) display is provided.

Meanwhile, when a predetermined driving voltage is applied to the pixel electrode 190 so that a predetermined electric field is formed between the pixel electrode 190 and the common electrode 170, the direction of the alignment of the liquid crystal changes and the state of polarization of light that passes through the liquid crystal layer 200 changes. Therefore, as for the light that passes through the liquid crystal layer 200, the amount of light in accordance with the degree of change of the state of polarization transmits through the polarization layer 150 so as to enter into the reflective layer 130. The light that enters into the reflective layer 130 is reflected from the reflective layer 130 so as to enter into the polarization layer 150 again, and at the time of reflection from the reflective layer 130 the state of polarization of light that transmits through the polarization layer 150 is maintained almost as is. Therefore, a majority of the light that enters into the polarization layer 150 again transmits through it, and then passes through the liquid crystal layer 200 so as to enter into the first polarizing plate 210. At this time, the state of polarization of light that passes through the liquid crystal layer 200 changes likewise. Therefore, as for the light that passes through the liquid crystal layer 200, the amount of light in accordance with the degree of change in the state of polarization transmits through the first polarizing plate 210, and therefore a predetermined brightness is displayed. That is to say, in the case where the driving voltage is zero, a black (dark) display is provided, whereas when a predetermined driving voltage is applied, a bright display is provided, and thus a so-called normally black type reflection display is implemented.

Next, the characteristics of the present embodiment are described in detail. In the present embodiment, as shown in FIG. 1, a data line 7 is provided in the center portion of a pixel. In addition, there are two reflection areas RA formed of a reflective layer 130 and a polarization layer 150 within one pixel, and these reflection areas RA divide the transmission area TA into three parts. At this time, a slit in the common electrode 175 and a slit in the pixel electrode 191 are provided in such a location as to overlap the data line 7, in such a location as to overlap the reflection area RA, or between pixels.

An object of the present invention is to implement a bright transmissive display having a wide viewing angle with a high contrast ratio. In order to widen the viewing angle, the slit in the common electrode 175 and the slit in the pixel electrode 191 are aligned so that liquid crystal molecules incline in four directions when an electric field is applied to the liquid crystal layer 200. Here, the slit in the common electrode 175 and the slit in the pixel electrode 191 hardly change the direction of liquid crystal molecules when an electric field is applied to the liquid crystal layer 200, and therefore do not contribute to the brightness of the display. In addition, the step between portions where there is an electrode and portions where there are no electrodes causes disturbance in the alignment of liquid crystal molecules, and thus there is a possibility that this may cause light to leak at the time of the black display.

Therefore, the present invention provides a structure where the slit in the common electrode 175 and the slit in the pixel electrode 191 do not negatively affect the transmissive display. Concretely, the structure allows the data line 7 and the reflective layer 130 that forms the reflection area RA to overlap the slit in the common electrode 175 and the slit in the pixel electrode 191. Here, as described above, the data line 7 and the reflective layer 130 are formed of a metal, and therefore light from the backlight can be blocked. Thus, the area that overlaps the data line 7 and the reflective layer 130 does not affect the transmissive display, and therefore the negative effects of the slit in the common electrode 175 and the slit in the pixel electrode 191 on the transmissive display can be eliminated.

Here, in order to widen the viewing angle, it is necessary for the slit in the common electrode 175 and the slit in the pixel electrode 191 to be placed partially within the pixel so that the liquid crystal molecules incline in four directions when an electric field is applied to the liquid crystal layer 200. In this case, the transmission area TA is divided into four areas where the liquid crystal molecules incline in different directions when an electric field is applied to the liquid crystal layer 200. At this time, it is necessary for the slit in the common electrode and the slit in the pixel electrode to be partially placed in the center portion of the pixel in order to make the four areas of which the direction in which the liquid crystal molecules incline is different formed uniformly within one pixel.

Thus, the data line 7 is placed in the center portion of the pixel according to the present embodiment. In addition, the reflective layer 130 is also placed within a pixel for the same reason, and at this time the reflective layer 130 is formed in two portions within one pixel so that this reflective layer 130 divides the transmission area in three parts. One of the transmission areas divided by the reflective layer 130 is optically divided into two areas by the data line 7, and therefore the transmission area is divided into four areas of which the direction in which the liquid crystal molecules incline is different when an electric field is applied.

As described above, in the present embodiment, the slit in the common electrode and the slit in the pixel electrode, which do not contribute to the brightness of the transmissive display and become a factor of lowering the contrast ratio, overlap the data line 7 and the reflective layer 130, and thus the negative effects thereof can be reduced. At this time, the data line 7 and the reflective layer 130 are in the area that does not originally contribute to the transmissive display, and therefore the brightness of the transmission area TA is not damaged. Furthermore, in the present embodiment, the switching element 120 and the gate line 8, which do not contribute to the transmissive display like the data line 7 and the reflective layer 130, are placed in such a location as to overlap the reflective layer 130, that is to say, in the vicinity of the center of the pixel. Therefore, a bright VA system liquid crystal display device having a high contrast ratio and a wide viewing angle can be implemented.

Here, in the present embodiment, a polarization layer 150 is provided between the pixel electrode 190 and the reflective layer 130. In this case, a higher reflectance can be gained with a lower driving voltage in comparison with the case where the pixel electrode 190 is covered with the polarization layer 150. That is to say, the polarization layer 160 is not provided between the liquid crystal layer 200 and the pixel electrode 190 in the configuration, and thus the negative effects in the controlling of liquid crystal due to the polarization layer 160 can be eliminated. Therefore, such effects can be gained that the reflectance increases, the contrast ratio increases together with this, the consumption of power is reduced due to the lowering of the driving voltage, and the cost is reduced due to the use of a multipurpose driver having a low withstanding voltage.

In addition, in the present embodiment, the transmission area TA is not provided with a polarization layer 150. Therefore, a higher transmittance can be gained with a lower driving voltage in comparison with the case where the polarization layer 150 covers the pixel electrode 190. That is to say, the negative effects in the controlling of liquid crystal due to the polarization layer 150 can be reduced when no polarization layer 150 is provided between the liquid crystal layer 200 and the pixel electrode 190, and the number of members that absorb light in the transmission area TA is reduced when there is no polarization layer 150.

Therefore, such effects are gained that the transmittance increases and the contrast ratio increases together with this, and furthermore the power for the backlight can be lowered by the amount of increase of the transmittance for the image display having the same brightness. In addition, such effects can be gained that the consumption of power is reduced due to the lowering of the driving voltage, and the cost is reduced due to the use of a multipurpose driver having a low withstanding voltage.

Here, though a slit is provided in the pixel electrode in the present embodiment, the same effects can be achieved according to the present invention in the case where a protrusion is provided.

In addition, though the effects of the present invention can be achieved when the slit in the common electrode 175 overlaps the data line 7 even partially in the direction of normal to the first transparent substrate 110, the effects of the invention can be achieved when the width of the data line 7 is greater than the width of the slit in the common electrode 175 and the data line 7 is placed so as to overlap the slit in the common electrode 175.

In addition, the reflective layer 130 may be provided above the pixel electrode 190 in the reflection area RA (on the liquid crystal layer side). In this case, it is desirable for the reflective layer 130 to be made of a conductor so that it also functions as a pixel electrode 190. A metal or an alloy such as chromium, aluminum or silver, can be used for this reflective layer 130. This is the same in the other embodiments. Here, it is necessary for the location of the polarization layer 150 to be above the reflective layer 130 in order to gain the effects according to the present invention, and therefore the location of the polarization layer 150 is above the pixel electrode 190 in this case.

Second Embodiment

Figure 7:
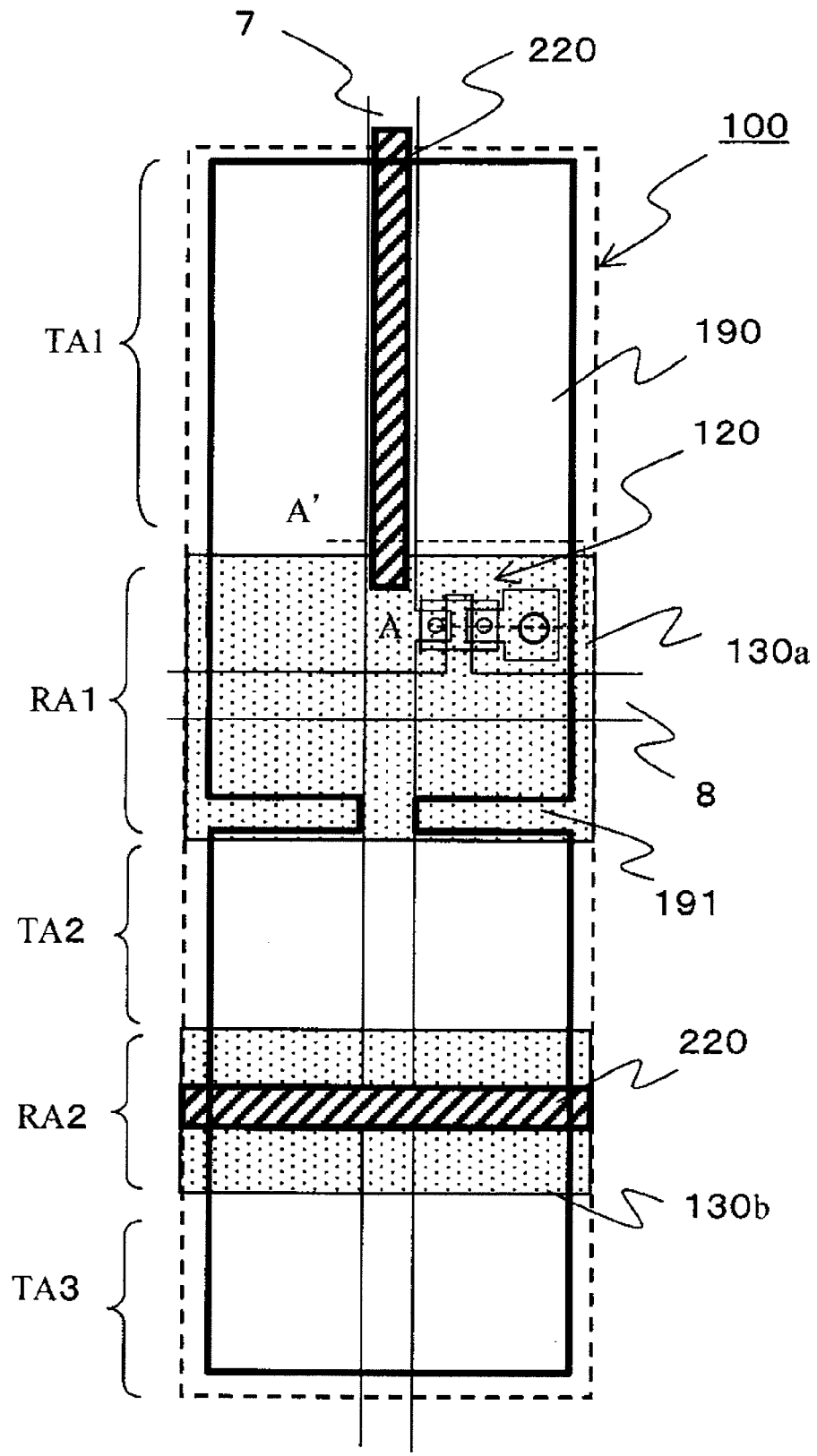
FIG. 7 is a plan diagram schematically showing the configuration of a main portion of a (sub)pixel of the liquid crystal display panel in the liquid crystal display device according to the present invention.
Figure 8:
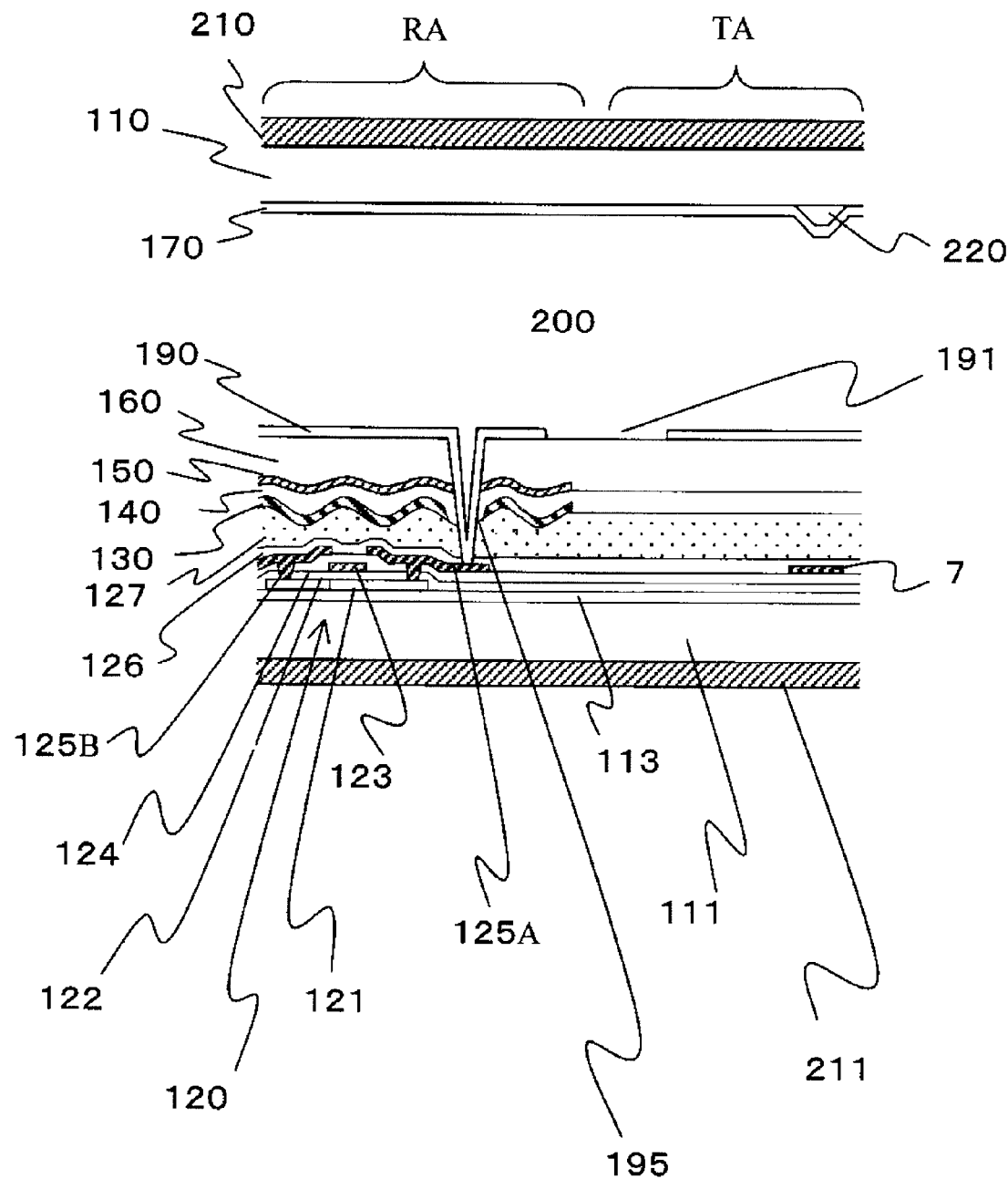
FIG. 8 is a cross sectional diagram schematically showing the configuration of a main portion of a (sub)pixel of the liquid crystal display panel in the liquid crystal display device according to the present invention.

Next, the liquid crystal display device according to another embodiment of the present invention is described in reference to the drawings. FIG. 7 is a plan diagram schematically showing the configuration of a main portion of a sub-pixel 100 on the liquid crystal display panel in the liquid crystal display device according to the present invention. In addition, FIG. 8 is a cross sectional diagram schematically showing the configuration of a main portion of a sub-pixel 100 on the liquid crystal display panel in the liquid crystal display device according to the present invention, and this is a cross sectional diagram along line A-A' in FIG. 7 schematically showing the structure.

The present embodiment provides the same liquid crystal display device as that according to the first embodiment with a protrusion coated with the common electrode 170 (protrusion of the common electrode 220) in the location where the slit in the common electrode 175 is provided instead of the slit in the common electrode 175, and the structure in other portions is the same as that of the liquid crystal display device according to the first embodiment, and therefore the same symbols are attached to the portions having the same functions, and the descriptions thereof are not repeated.

The protrusion of the common electrode 220 regulates the direction in which liquid crystal molecules incline when an electric field is applied to the liquid crystal layer 200. An insulating organic material, inorganic material or conductive material can be used for the protrusion of the common electrode 220 and may be patterned in accordance with a photolithographic technology. Here, it is necessary to form a protrusion having a gradual inclination in a predetermined location, and therefore there is an advantage in that the process can be simplified in the case where the material of the protrusion of the common electrode 220 is photosensitive. Furthermore, the material does not reflect light from the outside, and therefore it is desirable to be colored. Accordingly, a colored organic material, such as photosensitive polyimide or an acryl based resin, is desirable for the protrusion of the common electrode 220. Here, the protrusion having a gradual inclination may be formed by raising the temperature after the formation of a pattern so that the material is melted, or by using a half-tone mask at the time of the process for light exposure.

Next, the characteristics of the present embodiment are described in detail. In the present embodiment, the data line 7 is provided in the center portion of the pixel in the same manner as the first embodiment. In addition, there are two reflection areas RA formed of a reflective layer 130 and a polarizing later 150 within one pixel so that the transmission area TA is divided into three parts by these reflection areas RA. At this time, the protrusion of the common electrode 220 and the slit in the pixel electrode 191 are provided in such a location as to overlap the data line 7, in such a location as to overlap the reflection area RA, or between pixels.

Here, the protrusion of the common electrode 220 and the slit in the pixel electrode 191 hardly change the direction of liquid crystal molecules when an electric field is applied to the liquid crystal layer 200, and therefore do not contribute to the brightness of the display. In addition, there are liquid crystal molecules aligned in the direction perpendicular to the inclined surface of the protrusion of the common electrode 220 in particular, and therefore this causes light to leak at the time of the black display even when no electric field is applied to the liquid crystal layer 200. Furthermore, the step between the portion where there is an electrode and the portion where there are no electrodes causes disturbance in the alignment of the liquid crystal molecules in the slit in the pixel electrode 191, and there is a possibility that this may cause light to leak at the time of the black display.

Therefore, in the present embodiment as well, the protrusion of the common electrode 220 and the slit in the pixel electrode 191, which do not contribute to the brightness of the transmissive display and become a factor of lowering the contrast ratio, overlap the data line 7 and the reflective layer 130, and thus the negative effects thereof can be reduced. At this time, the data line 7 and the reflective layer 130 are in the area that does not originally contribute to the transmissive display, and therefore the brightness of the transmission area TA is not damaged. Furthermore, in the present embodiment, the switching element 120 and the gate line 8, which do not contribute to the transmissive display like the data line 7 and the reflective layer 130, are placed in such a location as to overlap the reflective layer 130, that is to say, in the vicinity of the center of the pixel. Therefore, a bright VA system liquid crystal display device having a high contrast ratio and a wide viewing angle can be implemented. In the present embodiment particularly, such effects can be gained where external light is reflected from the data line 7 so as to prevent the contrast ratio from lowering by coloring the protrusion of the common electrode 220 that overlaps the data line 7.

Here, though a slit is provided in the pixel electrodes in the present embodiment, the effects of the present invention can be achieved even in the case where a protrusion is provided.

Third Embodiment

Next, the liquid crystal display device according to still another embodiment of the present invention is described in reference to the drawings. Here, the same symbols are attached to the portions having the same functions as in the liquid crystal display devices according to the above described embodiments, and the descriptions thereof are not repeated.

Figure 9:
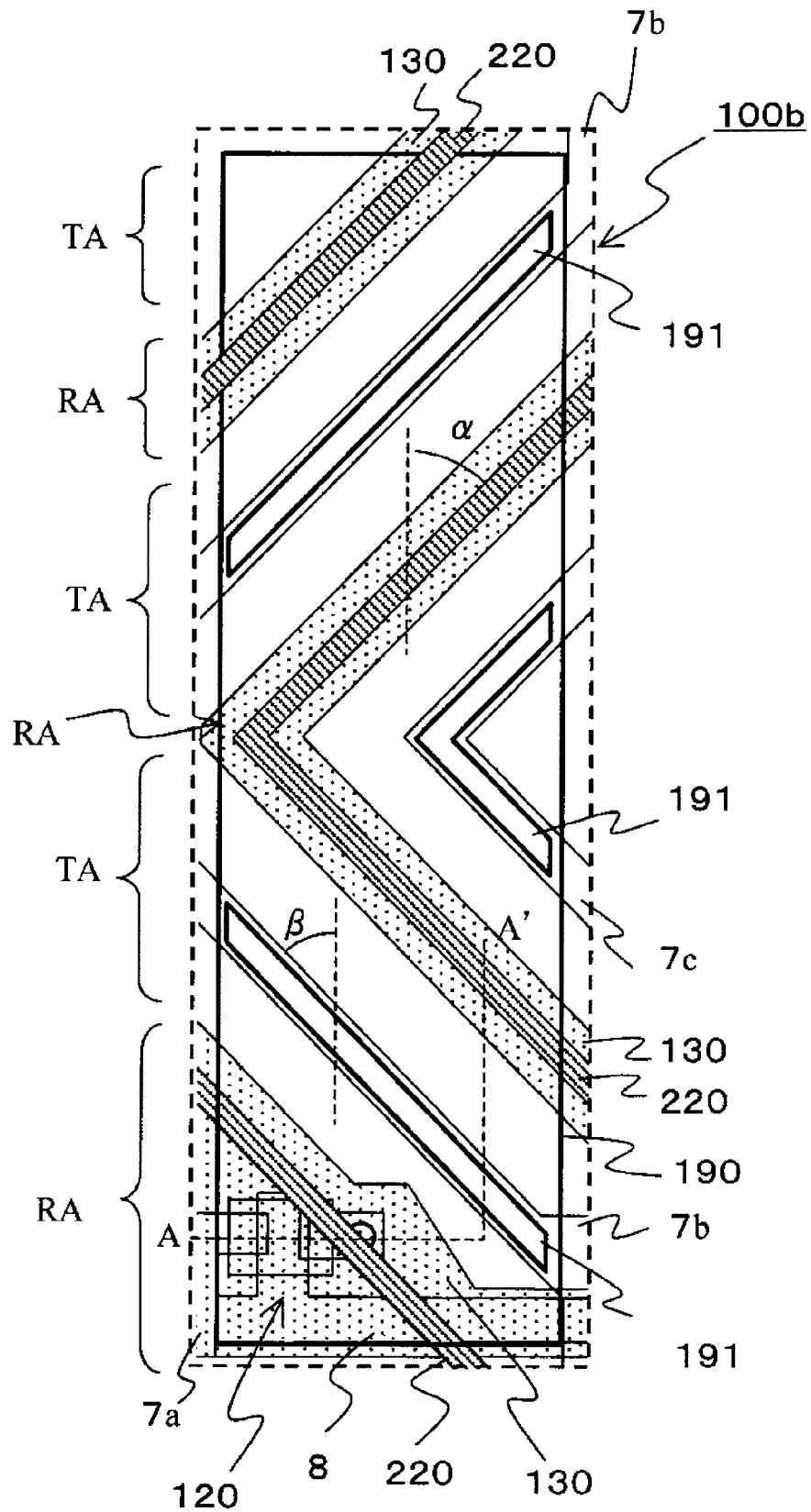
FIG. 9 is a plan diagram schematically showing the configuration of a main portion of a (sub)pixel of the liquid crystal display panel in the liquid crystal display device according to the present invention.
Figure 10:
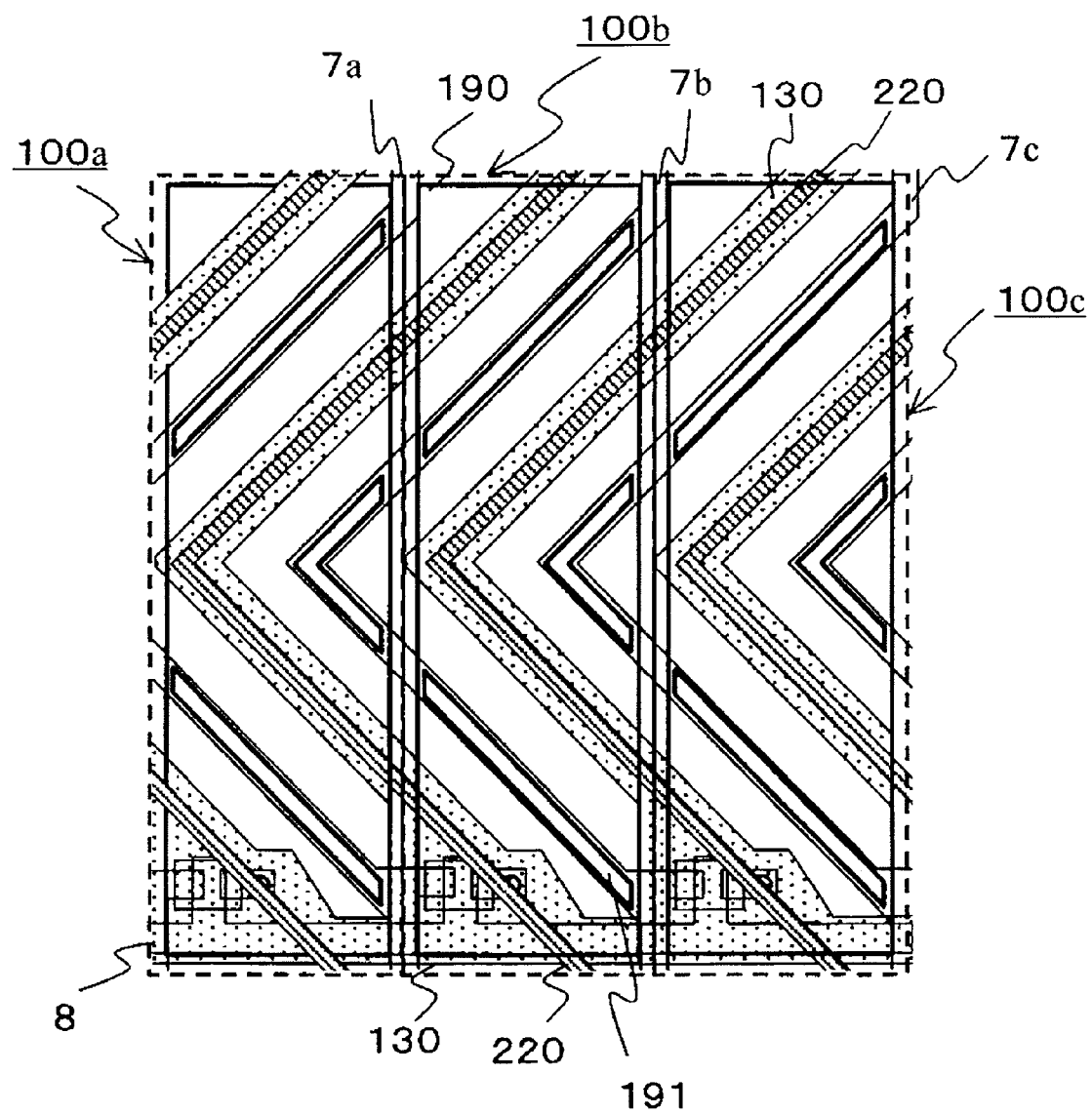
FIG. 10 is a plan diagram schematically showing the configuration of main portions of three adjacent (sub)pixels of the liquid crystal display panel in the liquid crystal display device according to the present invention.
Figure 11:
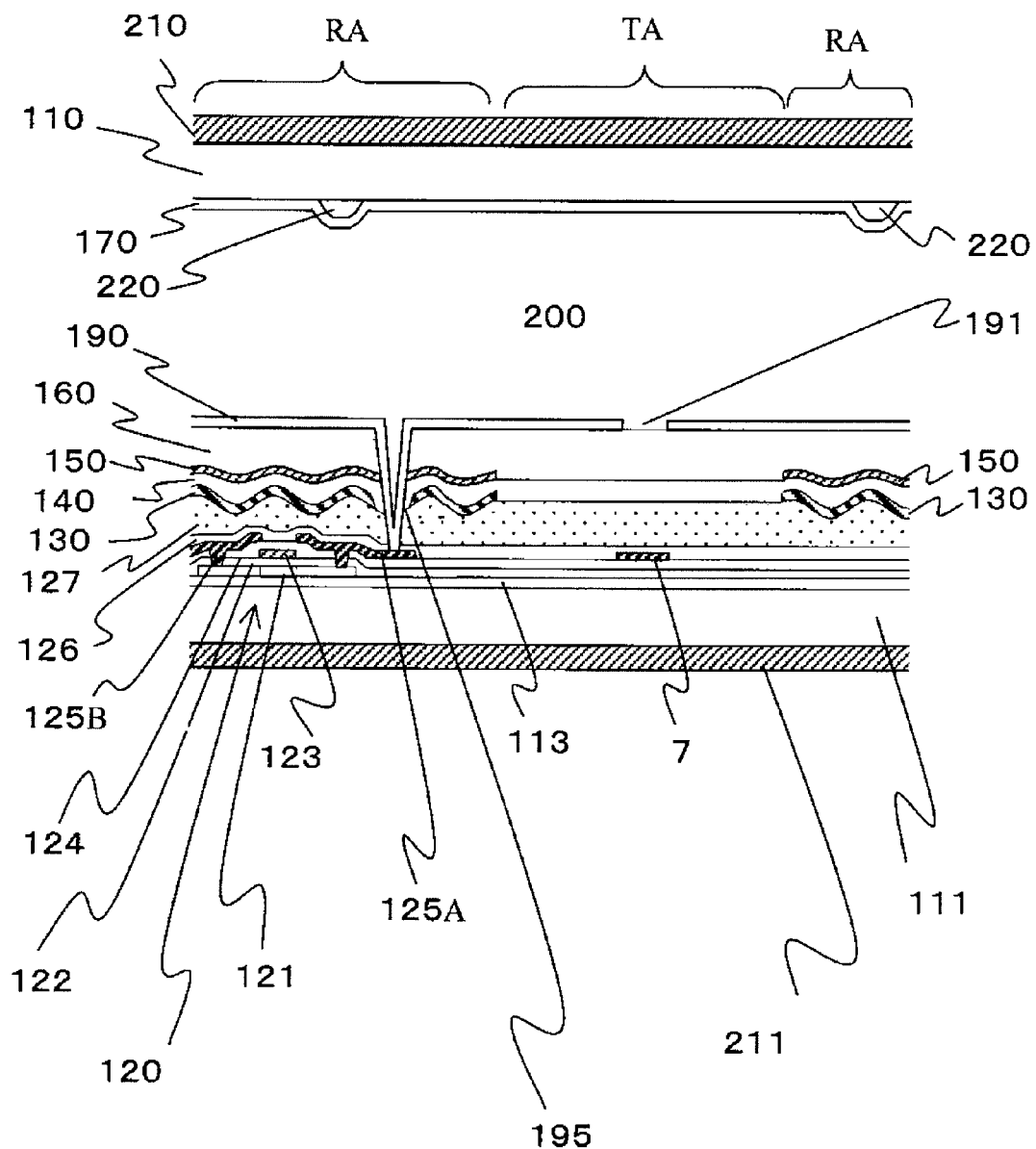
FIG. 11 is a cross sectional diagram schematically showing the configuration of a main portion of a (sub)pixel of the liquid crystal display panel in the liquid crystal display device according to the present invention.

FIG. 9 is a plan diagram schematically showing the configuration of a main portion of a sub-pixel 100 on the liquid crystal display panel in the liquid crystal display device according to the present invention. In addition, FIG. 10 is a plan diagram schematically showing the configuration of a main portion of three adjacent sub-pixels 100 on the liquid crystal display panel in the liquid crystal display device according to the present invention. In addition, FIG. 11 is a cross sectional diagram schematically showing the configuration of a main portion of a sub-pixel 100 on the liquid crystal display panel in the liquid crystal display device according to the present invention, and this is a cross sectional diagram schematically showing the structure along line A-A' in FIG. 9.

In the present embodiment, a protrusion of the common electrode 220 is provided on the first transparent substrate 110, and a slit in the pixel electrode 191 is provided in the second transparent substrate 111. The longitudinal direction of the slit in the pixel electrode 191 is at an angle β relative to the direction in which the data line 7 extends, and the longitudinal direction of the protrusion of the common electrode 220 is at an angle α relative to the direction in which the data line 7 extends. Here, the angles α and β may be selected so that the longitudinal directions of the slit in the pixel electrode 191 and the protrusion of the common electrode 220 become parallel. In addition, it is desirable for there to be portions where the angles α and β are 45° or 135° for the below described reasons. That is to say, it is desirable for the protrusion of the common electrode 220 and the slit in the pixel electrode 191 to be in zigzag form where the bent angle is 90°.

The data line 7 is formed in such a location as to overlap the slit in the pixel electrode 191 as viewed in the direction perpendicular to the surface of the substrate that forms the liquid crystal display panel 1. That is to say, the data line 7 has a zigzag form that inclines at an angle β relative to the direction in which the data line 7 extends. At this time, as shown in FIG. 10, the data line overlaps a number of adjacent sub-pixels, in other words, it is aligned across a number of adjacent sub-pixels. Concretely, the data line 7b in the figure overlaps a sub-pixel 100a and a sub-pixel 100b. The data line 7 can efficiently overlap the slit in the pixel electrode 191 when the data line overlaps a number of adjacent sub-pixels in the configuration. That is to say, the slit in the pixel electrode 191 and the data line 7, which do not contribute to the brightness of the transmissive display, overlap in a state where there is little waste, and therefore the brightness of the display is barely given up, and thus effects can be gained where a brighter display can be achieved. Furthermore, as for the possibility of light being caused to leak by the step of electrodes in the slit in the pixel electrode 191, light can be prevented from leaking at the time of the black display when the data line blocks light, and therefore a high contrast ratio can be expected.

Meanwhile, the reflection area RA formed of a reflective layer 130 and a polarization layer 150 also has a zigzag form which inclines by an angle α relative to the direction in which the data line 7 extends while maintaining a constant distance from the data line 7. In addition, the reflection area RA formed of the reflective layer 130 and the polarization layer 150 is also provided in such a location as to overlap the gate line 8 and the switching element 120. At this time, the reflection area RA is formed in such a location as to overlap the protrusion of the common electrode 220 as viewed in the direction perpendicular to the surface of the substrate that forms the liquid crystal display panel 1. The protrusion of the common electrode 220 does not contribute to the brightness of the display when an electric field is applied to the liquid crystal layer 200 because the direction of the liquid crystal molecules hardly changes. In addition, there are liquid crystal molecules aligned in the direction perpendicular to the inclined surface of the protrusion of the common electrode 220 even when no electric field is applied to the liquid crystal layer 200, and therefore this causes light to leak at the time of the black display. Therefore, when the protrusion of the common electrode 220, which does not contribute to the brightness of the transmissive display and becomes a factor of lowering the contrast ratio, overlaps the reflective layer 130, the negative effects thereof can be eliminated. At this time, the reflective layer 130 is in an area that does not contribute to the transparent display and therefore does not lose the brightness in the transmission area. Therefore, a bright VA system liquid crystal display device having a high contrast ratio and a wide viewing angle can be implemented.

Figure 12:
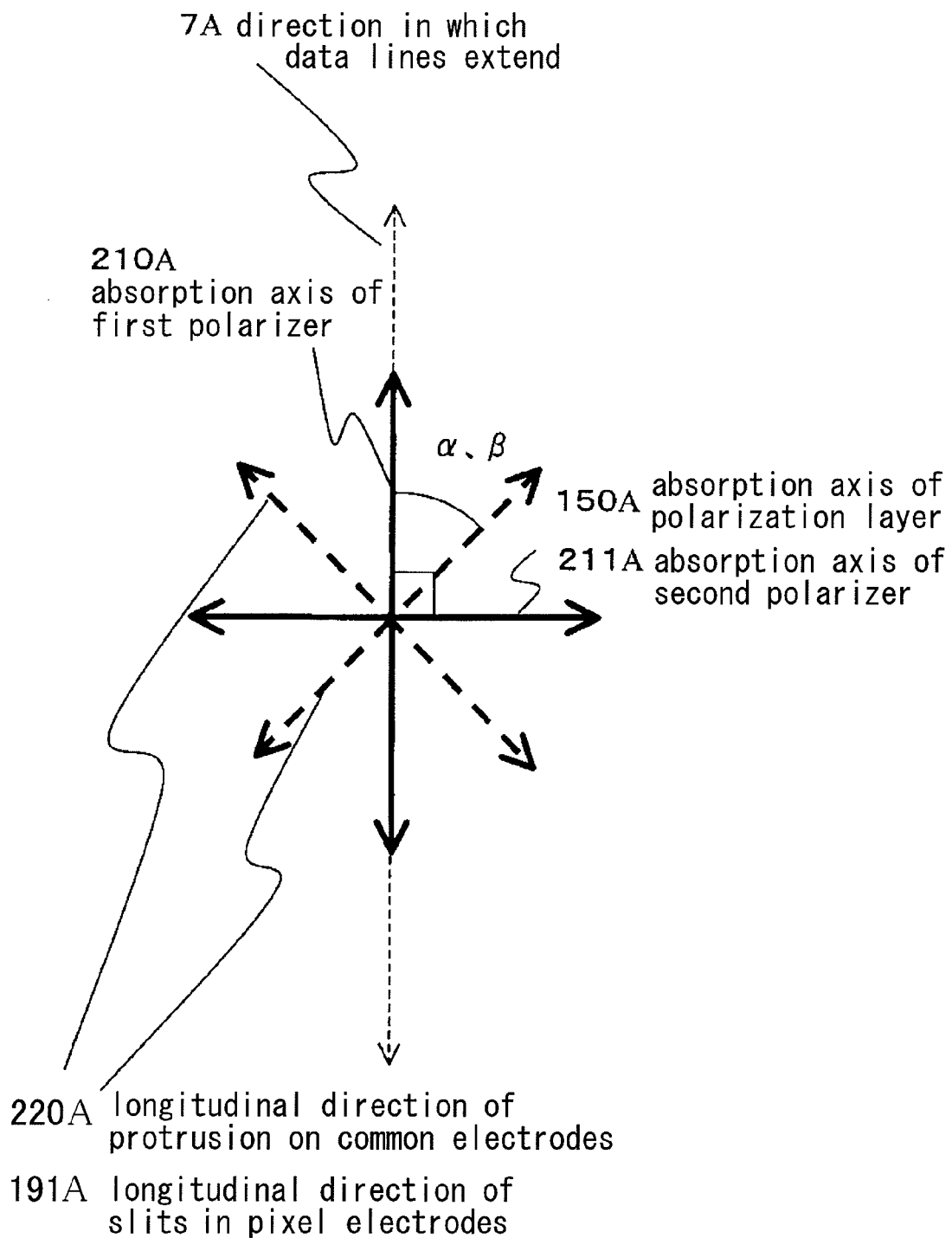
FIG. 12 is a diagram showing the relationship between optical axes of the members that form the liquid crystal display panel in the liquid crystal display device according to the present invention.

FIG. 12 is a diagram illustrating an example of the relationship between the absorption axis 210A of the linearly polarized light of the first polarizer 210, the absorption axis 211A of the linearly polarized light of the second polarizer 211, the absorption axis 150A of the linearly polarized light of the polarization layer 150, the direction 7A in which the data lines 7 extend, the longitudinal direction 191A of the slits in the pixel electrodes 191, and the longitudinal direction 220A of the protrusions of the common electrodes 220. Here, there are two perpendicular directions within a sub-pixel 100, in terms of the longitudinal direction 191A of the slits in the pixel electrodes and the longitudinal direction 220A of the protrusions of the common electrodes.

The absorption axis 210A of the linearly polarized light of the first polarizer is parallel to the direction 7A in which the data lines extend. In addition, the absorption axis 210A of the linearly polarized light of the first polarizer and the absorption axis 211A of the linearly polarized light of the second polarizer are perpendicular to each other, and the absorption axis 150A of the polarization layer 150 is in the direction parallel to the absorption axis 211A of the linearly polarized light of the second polarizer 211. That is to say, the absorption axis 211A of the linearly polarized light of the second polarizer is perpendicular to the direction in which the data lines extend.

In addition, the angles β and α formed between the direction 7A in which the data lines extend, the longitudinal direction 191A of the slits in the pixel electrodes 191 and the longitudinal direction 220A of the protrusions of the common electrodes 220 are either 45° or 135°, as described above.

In the present invention also, as in conventional VA system liquid crystal display devices, the direction in which the liquid crystal molecules incline when an electric field is applied to the liquid crystal layer 200 is perpendicular to the longitudinal direction of nearby slits in the pixel electrodes 191 or protrusions of the common electrodes 220. Thus, the direction in which liquid crystal molecules incline when an electric field is applied to the liquid crystal layer 200 becomes 45° or 135° relative to the absorption axis 210A of the linearly polarized light of the first polarizer, the absorption axis 211A of the linearly polarized light of the second polarizer, and the absorption axis 150A of the polarization layer 150.

The absorption axis 150A of the polarization layer 150 is perpendicular to the direction 7A in which the data lines 7 extend, as described above. Accordingly, in the case where the same material as described in "Y. Ukai et al., 'Current Status and Future Prospect of In-Cell Polarizer Technology,' SID 04 DIGEST, pp. 1170-1173, 2004," for example, the direction in which it is applied may be the direction parallel to the direction 7A in which the data lines extend.

Here, the second transparent substrate 111 that forms the liquid crystal display panel 1 is usually in rectangular form with the sides parallel to the direction in which the data lines 7 and the gate lines 8 extend. Therefore, as described in the first embodiment, in the case where the absorption axis of the polarization layer 150 inclines relative to the direction 7A in which the data lines 7 extend, and the material described in "Y. Ukai et al., 'Current Status and Future Prospect of In-Cell Polarizer Technology,' SID 04 DIGEST, pp. 1170-1173, 2004," for example, or a material for creating the absorption axis in the direction perpendicular to the direction in which the material is applied as in Ukai, it is necessary for the direction in which the material is applied to be inclined by 45° relative to the direction 7A in which the data lines 7 extend, that is to say, relative to the sides of the second transparent substrate 111. In this case, the material cannot be applied in corner portions of the transparent substrate using a general slit die coater, and therefore, an invalid region where the material cannot be applied to the substrate becomes necessary.

In contrast, in the present embodiment, the absorption axis 150A of the polarization layer 150 is perpendicular to the direction 7A in which the data lines 7 extend. Accordingly, in the case where the material described in "Y. Ukai et al., 'Current Status and Future Prospect of In-Cell Polarizer Technology,' SID 04 DIGEST, pp. 1170-1173, 2004," for example, or a material for creating the absorption axis in the direction perpendicular to the direction in which the material is applied as in Ukai the direction in which the material is applied may be the direction 7A in which the data lines 7 extend, that is to say, the direction parallel to the sides of the second transparent substrate 111. In this case, the invalid region, where the material for the polarization layer cannot be applied to the substrate, becomes small, and there is an advantage, such that the productivity is higher.

In addition, the second transparent substrate 111 that forms the liquid crystal display panel 1 is gained by cutting one large mother substrate into a number of pieces after carrying out various processes on the mother substrate. The mother substrate is in rectangular form, and therefore, in the case where the direction in which the material for the polarization layer is applied is the direction 7A, in which the data lines 7 extend, that is to say, the direction parallel to the sides of the second transparent substrate 111, as in the present embodiment, the invalid region, where the material for the polarization layer cannot be applied, becomes small, and thus, the second transparent substrate 111 can be efficiently acquired. That is to say a large number of second transparent substrates 111 can be acquired from one mother substrate, effects can be gained, such that the productivity is high the cost is lower.

In the present embodiment also, the direction of liquid crystal molecules barely changes when an electric field is applied to the liquid crystal layer 200, and therefore, the protrusions of the common electrode 220 and the slits in the pixel electrodes 191 do not contribute to the brightness of the display. In addition, there are liquid crystal molecules aligned in the direction perpendicular to the inclined surface of the protrusions of the common electrodes 220 even when no electric field is applied to the liquid crystal layer 200, which causes light to leak at the time of black display. Furthermore, the steps between portions where there is an electrode and portions where there are no electrodes causes disturbance in the alignment of liquid crystal molecules in the slits in the pixel electrodes 191, and there is a possibility that this may cause light to leak at the time of black display.

In the present embodiment also, the protrusions of the common electrodes 220 and the slits in the pixel electrodes 191 which do not contribute to the brightness of the transmissive display and are a factor in the contrast ratio lowering, overlap with the data lines and the reflective layer 130, and thus, the negative effects can be eliminated. At this time, the data lines 7 and the reflective layer 130 are areas which do not initially contribute to the transmissive display and therefore, the brightness in the transmission area TA is not affected. Therefore, a VA system liquid crystal display device having a high contrast ratio and a wide viewing angle can be implemented.

In addition, in the present embodiment, the data lines 7 and the slits in the pixel electrodes 191 overlap. In this case, both structures are processed on the second transparent substrate 11, and therefore, positioning is possible with high precision in comparison with the case where portions formed on different substrates are positioned. That is to say, the margin for positioning the first transparent substrate 110 and the second transparent substrate 111 may be small, and therefore, the area that can be used for display is wider, and effects can be gained, such that brighter display is possible.

In the present embodiment also, as in the above described embodiments, the required driving voltage is lower and a higher reflectance can be gained in the case where a polarization layer 150 is placed between the pixel electrodes 190 and the reflective layer 130 in the reflection area RA, by comparison with in the case where the pixel electrodes 190 are covered with the polarization layer 150, that is to say, in the case where a polarization layer 150 is provided between the liquid crystal layer 200 and the pixel electrodes 190.

In addition, the polarization layer 150 is removed from the transmission area TA, and the required driving voltage is lower and a higher transmittance can be gained in comparison with in the case where there is a polarization layer 150 covering the pixel electrodes 190. Thus, such effects are gained that the transmittance increases and the contrast ratio increases together with this, and furthermore, the power for the backlight can be lowered by the amount by which the transmittance increases for an image display of the same brightness. In addition, such effects can be gained that the power consumption is lower, due to the lower driving voltage, and the cost can be reduced by using a multipurpose driver with a lower withstand voltage.

Here, the same effects can be gained when the absorption axis 210A of the linearly polarized light of the first polarizer 210, the absorption axis 21A of the linearly polarized light of the second polarizer 211, and the absorption axis 150A of the polarization layer 150 are rotated together by 90° in the direction shown in FIG. 12.

Here, though in the present embodiment, slits are provided in the pixel electrodes, the effects of the present invention can be gained evening the case where protrusions are provided on the pixel electrodes.

Fourth Embodiment

Next, the liquid crystal display device according to another embodiment of the present invention is described in reference to the drawings. FIG. 13 is a cross sectional diagram schematically showing the configuration of a main portion of a sub-pixel 100 on the liquid crystal display panel in the liquid crystal display device according to the present invention.

The present embodiment provides the same liquid crystal display panel as the third embodiment, except that the transmission area TA is provided also in the polarization layer 150, and the same symbols are attached to components having the same function as in the liquid crystal display device in the above described embodiments, and the descriptions thereof are not repeated.

In the present embodiment, a polarization layer 150 is provided between the pixel electrodes 190 for driving the liquid crystal and the second transparent substrates 111 in the transmission area TA. The same material as for the polarization layer 150 formed in the reflection area can be used for the polarization layer 150, and the absorption axis 150A of the polarization layer 150 coincides with the absorption axis of the linearly polarized light of the second polarizer 211, as in the reflection area RA.

Unlike in the other embodiments described above, in the present embodiment, a polarization layer 150 is provided also in the transmission area TA, and the polarization layer 150 is not provided between the pixel electrodes 190 and the liquid crystal layer 200. Therefore, the negative effects on the drive of liquid crystal caused by the polarization layer 150 can all be eliminated. Thus, a higher transmittance can be gained with a lower driving voltage in comparison with in the case where a polarization layer 150 is covering the pixel electrodes 190, that is to say, in the case where a polarization layer 150 is placed between the liquid crystal layer 200 and the pixel electrodes 190.

Here, in the present embodiment, the transmittance lowers and the brightness of the display lowers when the polarization layer 150 is provided in the transmission area TA. However, the lowering of the transmittance in black (dark) display when a polarization layer 150 is provided is greater than the lowering of the transmittance in white (bright) display, and therefore, and effects are gained, such that the contrast ratio on the transmissive display increases. When a polarization layer having a thickness of 300 nm and a dichromatic ratio of approximately 25 is formed in the transmission area, for example, the contrast ratio is approximately 1.9 times that in the case where there is no polarization layer in the transmission area.

In addition, in the present embodiment, the polarization layer 150 is provided in the transmission area TA, and therefore, there is a polarization layer 150 in an area which overlaps with the data lines 7. In this case external light can be prevented from reflecting from the data lines 7, and therefore, effects can be gained, such that the contrast ratio can be prevented from lowering due to external light.

Though in the present embodiment, slits are provided in the pixel electrodes and protrusions are provided on the common electrodes, the effects of the present invention can be gained also in the case where protrusions are provided on the pixel electrodes and slits are provided in the common electrodes.

Fifth Embodiment

Next, the liquid crystal display device according to another embodiment of the present invention is described in reference to the drawings. Here the same symbols are attached to components having the same function as in the liquid crystal display devices according to the above described embodiments, and the descriptions thereof are omitted.

Figure 14:
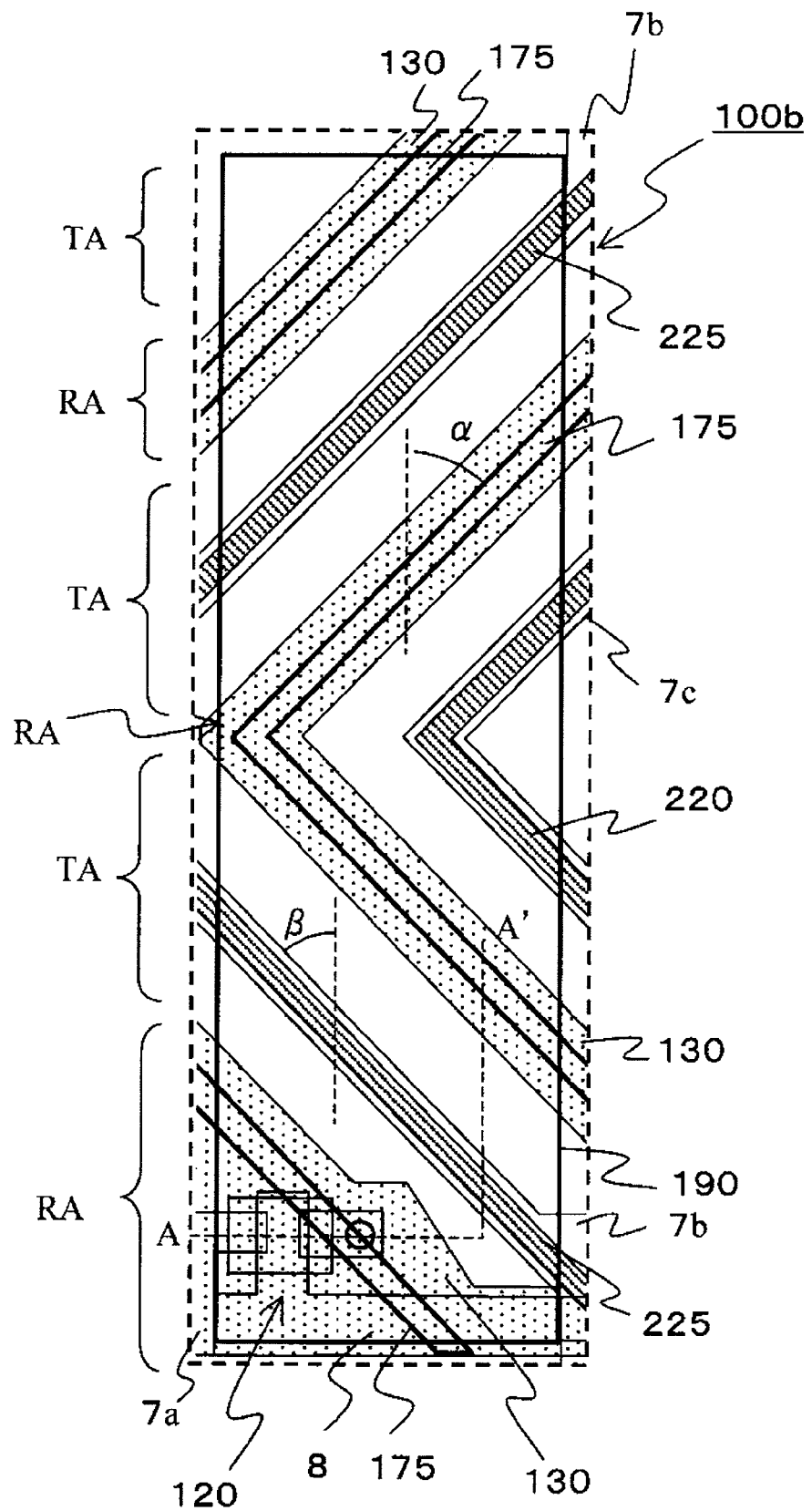
FIG. 14 is a plan diagram schematically showing the configuration of a main portion of a (sub)pixel of the liquid crystal display panel in the liquid crystal display device according to the present invention.
Figure 15:
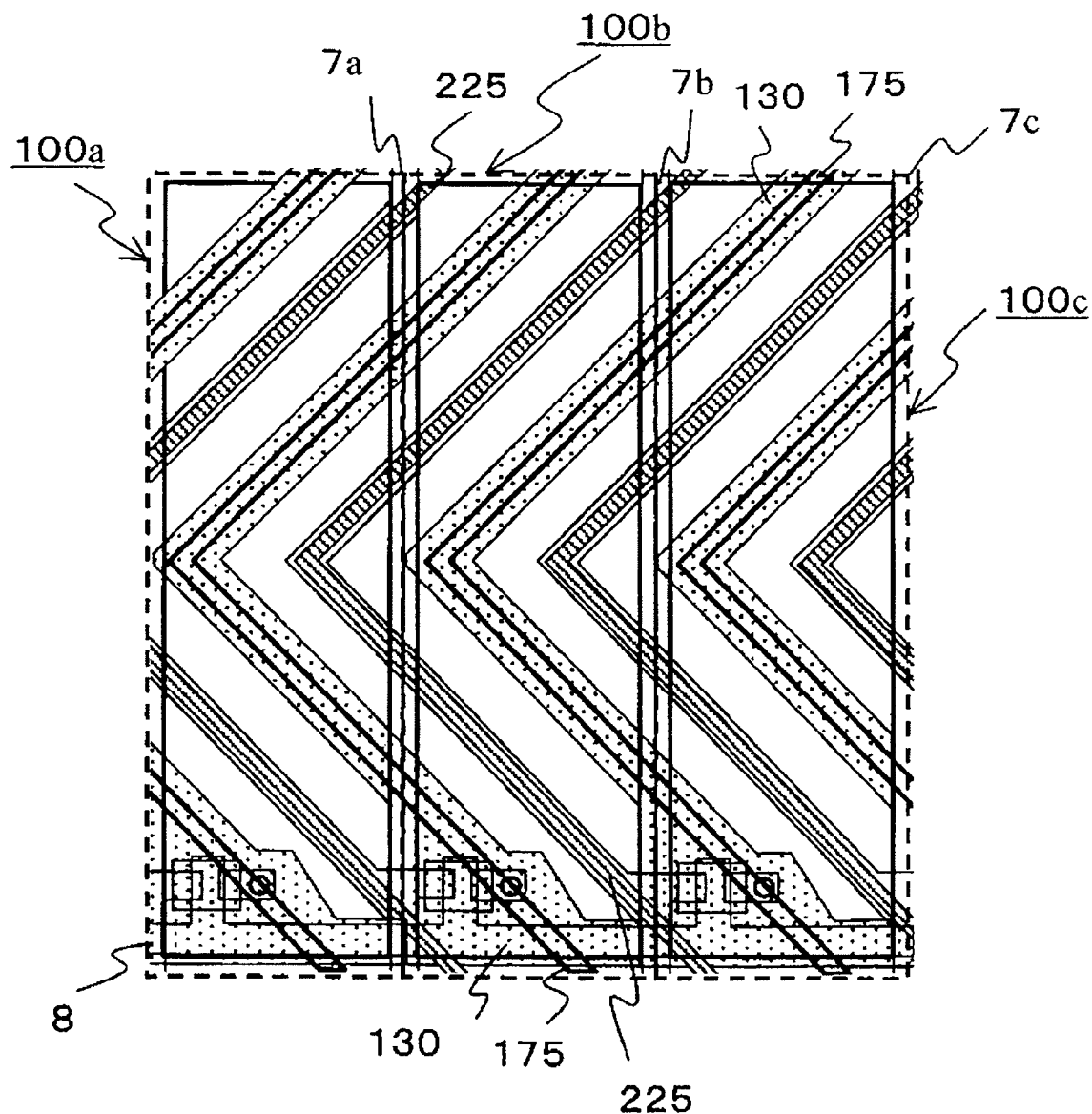
FIG. 15 is a plan diagram schematically showing the configuration of main portions of three adjacent (sub)pixels of the liquid crystal display panel in the liquid crystal display device according to the present invention.
Figure 16:
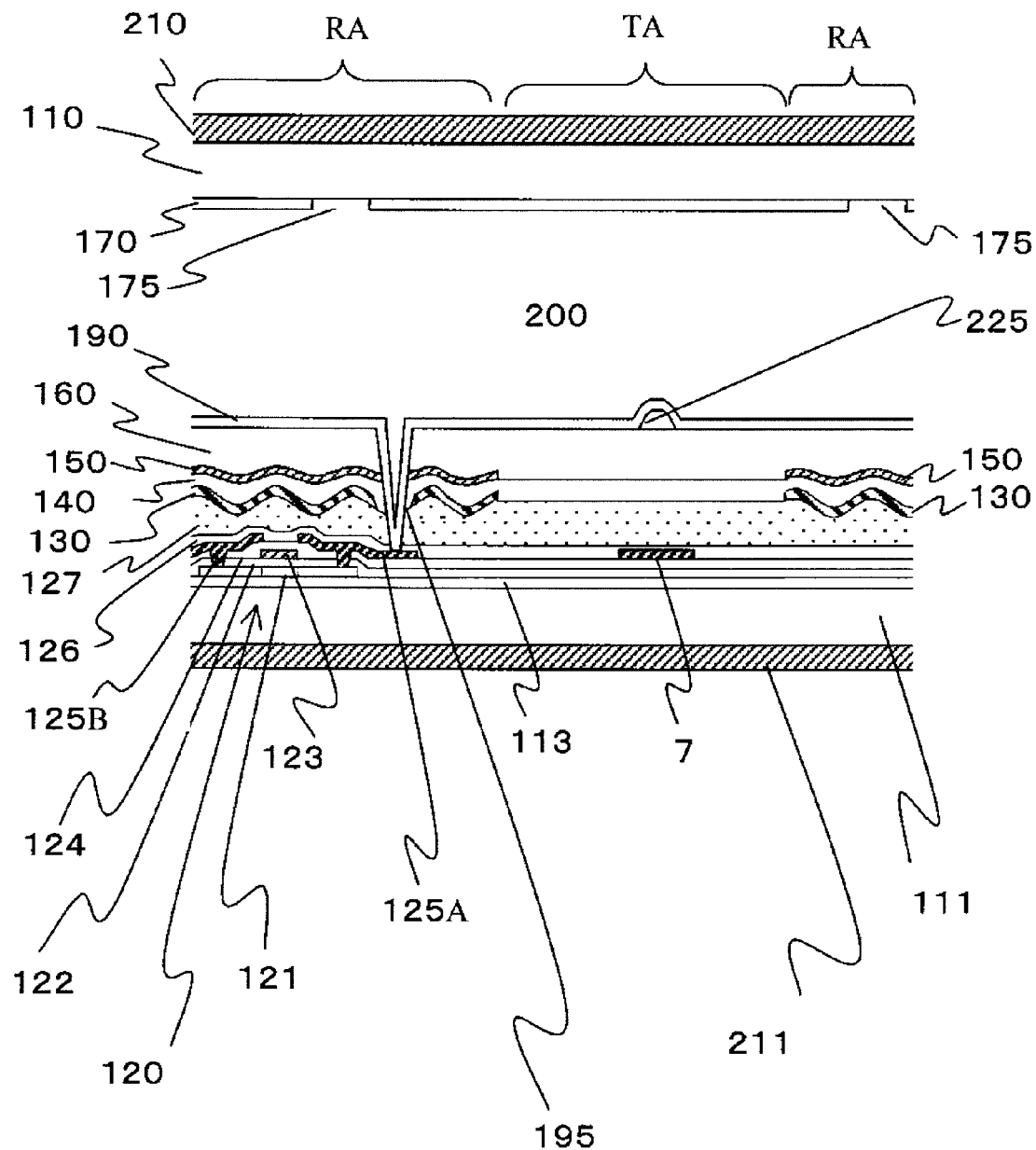
FIG. 16 is a cross sectional diagram Schematically showing the configuration of a main portion of a (sub)pixel of the liquid crystal display panel in the liquid crystal display device according to the present invention.

FIG. 14 is a plan diagram schematically showing the configuration of a main portion of a sub-pixel 100 on the liquid crystal display panel in the liquid crystal display device according to the present invention. In addition, FIG. 15 is a plan diagram schematically showing the configuration of a main portion of three adjacent sub-pixels 100 on the liquid crystal display panel in the liquid crystal display device according to the present invention. In addition, FIG. 16 is a cross sectional diagram schematically showing the configuration of a main portion of a sub-pixel 100 on the liquid crystal display panel in the liquid crystal display device according to the present invention, and a schematic cross sectional diagram along line A-A' in FIG. 14 showing the structure.

In the present embodiment, slits 175 are provided in the common electrodes instead of protrusions 220, as covered with the common electrodes provided on the first transparent substrate 110 in the third embodiment, and protrusions covered with pixel electrodes (hereinafter referred to as protrusions of pixel electrodes 225) are provided instead of slits 191, as in the pixel electrodes provided in the second transparent substrate 111. The structure of other parts is the same as in the liquid crystal display device according to the third embodiment, and therefore, the same symbols are attached to components having the same functions, and the descriptions thereof are not repeated.

An insulating organic material or inorganic material, or a conductive material can be used for the protrusions of the pixel electrodes 225, and the material may be patterned in accordance with a photolithographic technology. Here, it is necessary to form protrusions having a gradual inclination in a predetermined location, and therefore, there is an advantage, such that the process can be simplified in the case where the material for the protrusions of the pixel electrodes 225 is photosensitive. Furthermore, it is desirable for the material to be colored, in order to prevent it from reflecting external light. Accordingly, an organic material, such as colored photosensitive polyimide, or an acryl based resin, is desirable for the protrusions of the pixel electrodes 225. Here, protrusions having a gradual inclination may be formed by raising the temperature so as to melt the material after forming a pattern, or using a half-tone mask at the time of the process for light exposure.

In the present embodiment, the longitudinal direction of the protrusions of the pixel electrodes 225 forms an angle β with the direction 7A in which the data lines 7 extend, and the longitudinal direction of the slits in the common electrodes 175 forms an angle α with the direction 7A in which the data lines 7 extend. The angles α and β may be determined so that the longitudinal direction of the protrusions of the pixel electrodes 225 and the slits in the common electrodes 175 is the same. The angles α and β are either 45° or 135°, and the protrusions of the pixel electrodes 225 and the slits in the common electrodes 175 are in zigzag form with a bend angle of 90°.

The data lines 7 are formed in such a location as to overlap with the protrusions of the pixel electrodes 225 as viewed in a direction perpendicular to the surface of the substrate that forms the liquid crystal display panel 1. That is to say, the data lines 7 are in zigzag form and incline at an angle β relative to the direction 7A in which the data lines 7 extend. At this time, as shown in FIG. 15, the data lines 7 overlap with a number of adjacent sub-pixels 100. Concretely, the data line 7b in the figure overlaps with a sub-pixel 100b and a sub-pixel 100a. Thus, the data lines 7 overlap with a number of adjacent pixels 100 in the configuration, and thus, the data lines 7 efficiently overlap with protrusions of the pixel electrodes 225. That is to say the protrusions of the pixel electrodes 225 and the data lines 7 which do not contribute to the brightness of the transition display overlap with little waste of space, and therefore, brightness lost is little in the display, and effects are gained, such that a brighter display can be gained. Furthermore, the area where the liquid crystal molecules are diagonal on the inclining surface of the protrusions of the pixel electrodes 225 causes light to leak at the time of black display, but in the present embodiment, this area is blocked from light by data lines, and therefore, a high contrast ratio can be gained.

Meanwhile, the reflection area RA formed of the reflective layer 130 and the polarization layer 150 has a zigzag form and is inclined by an angle α relative to the direction in which the data lines 7 extend while keeping a constant distance from the data lines 7. In addition, the reflection area RA is formed of the reflective layer 130 and the polarization layer 150 in such a location as to overlap with the gate lines 8 and the switching elements 120. At this time, the reflection area RA is formed in such a location as to overlap with the slits in the common electrodes 175 as viewed in a direction perpendicular to the surface of the substrate that forms the liquid crystal display panel 1. The direction of liquid crystal molecules barely changes in the center portion of the slits in the common electrodes 175 when an electric field is applied to the liquid crystal layer 200, and therefore, the center portion does not contribute to the brightness of the display. In addition, there is a possibility of the slits in the common electrodes 175 causing light to leak at the time of black display, because the liquid crystal molecules are disturbed and directed in a different way in the steps of the electrodes. Therefore, the slits in the common electrodes 175 which do not contribute to the brightness of the transition display and are possible factors in the contrast ratio lowering overlap with the reflective layer 130, so that light from the backlight is blocked, and thus, the negative effects thereof can be eliminated. At this time, the reflective layer 130 is an area which does not contribute to the transition display, and therefore, the brightness in the transition area is not lost. Therefore, a bright VA system liquid crystal display device having a high contrast ratio and a wide viewing angle can be implemented.

In the present embodiment also, the absorption axis 150A of the polarization layer 150 is perpendicular to the direction 7A in which the data lines 7 extend, as in the third embodiment. Accordingly, in the case where the same material as described in "Y. Ukai et al., 'Current Status and Future Prospect of In-Cell Polarizer Technology,' SID 04 DIGEST, pp. 1170-1173, 2004" is used for the polarization layer 150, for example, the direction in which the material is applied may be parallel to the direction 7A in which the data lines 7 extend. In this case, the direction in which the material is applied is parallel to the sides of the second transparent substrate 111, and therefore, the invalid area where the material for the polarization layer cannot be applied to the substrate becomes small, and thus, there is an advantage, such that the productivity is high.

In addition, the data lines 7 and the protrusions of the pixel electrodes 225 overlap also in the present embodiment n this case, both structures are processed on the second transparent substrate 111, and therefore, the structures can be positioned with higher precision than in the case where structures formed on different substrates are positioned. That is to say, the margin for positioning of the first transparent substrate 110 and the second transparent substrate 111 may be small, and thus, the area that can be used for display is larger, and such effects can be gained that brighter display is possible.

In addition, in the present embodiment, the data lines 7 and the protrusions of the pixel electrodes 225 overlap. In this case, the protrusions of the pixel electrodes 225 are colored, and thus, such effects can be gained that the contrast ratio can be prevented from lowering due to reflection of external light from the data lines 7.

Though in the present embodiment, protrusions are provided on the pixel electrodes, the effects of the present invention can be gained also in the case where slits are provided in the pixel electrodes.

Sixth Embodiment

Next, the liquid crystal display device according to another embodiment of the present invention is described in reference to the drawings. Here, the same symbols are attached to components having the same functions as in the liquid crystal display devices according to the above described embodiments, and the descriptions thereof are omitted.

Figure 17:
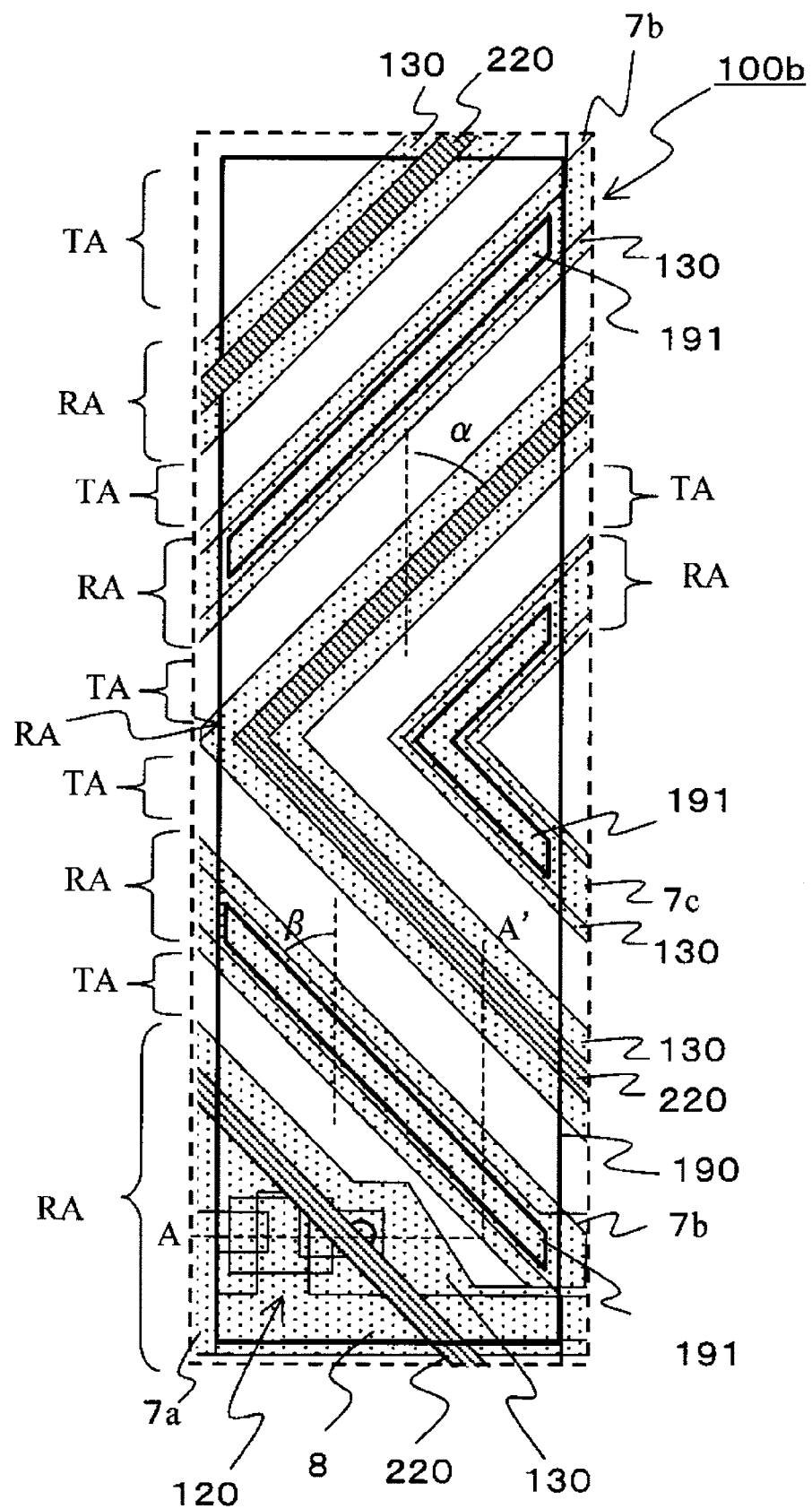
FIG. 17 is a plan diagram schematically showing the configuration of a main portion of a (sub)pixel of the liquid crystal display panel in the liquid crystal display device according to the present invention.
Figure 18:
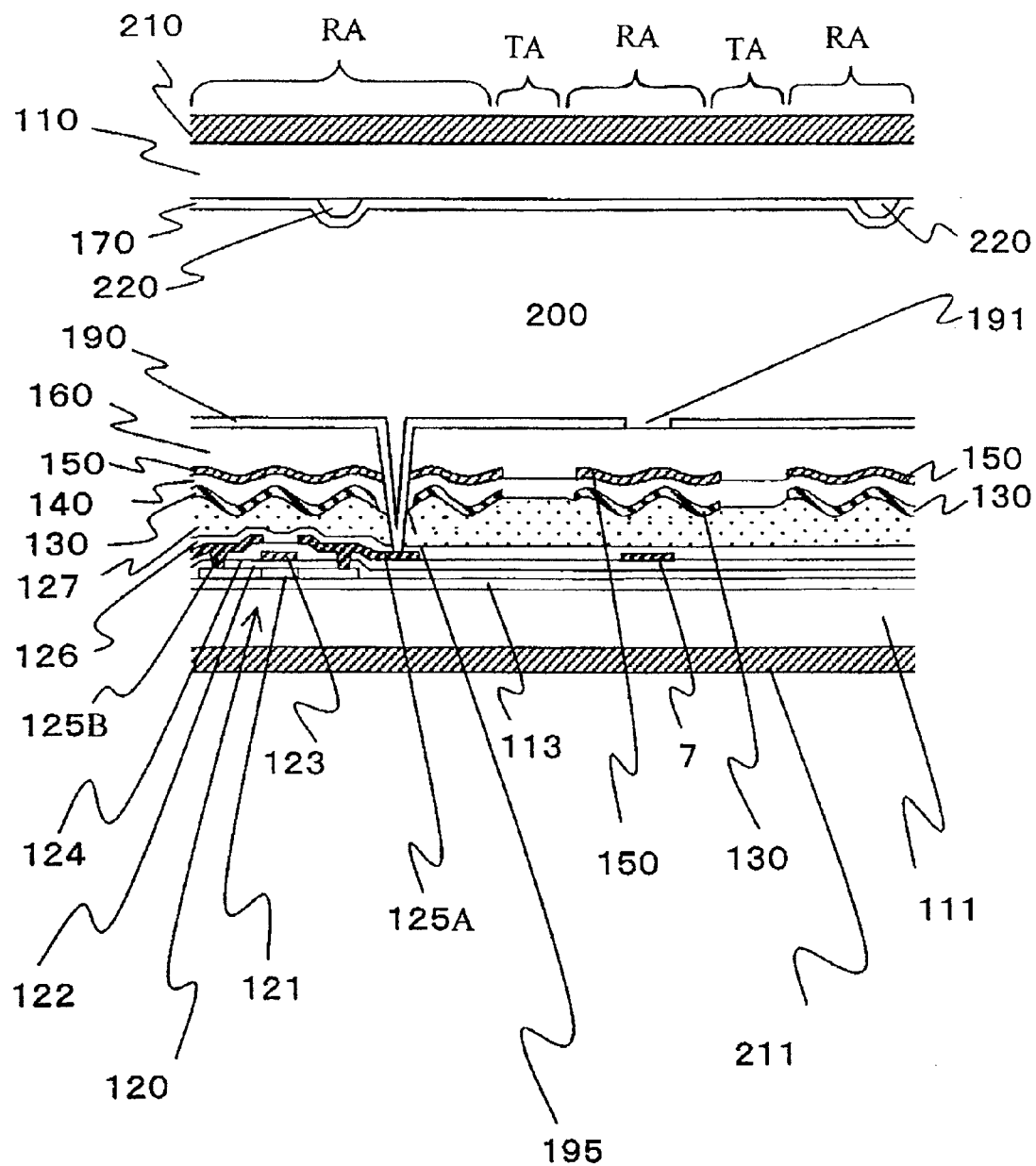
FIG. 18 is a cross sectional diagram schematically showing the configuration of a main portion of a (sub)pixel of the liquid crystal display panel in the liquid crystal display device according to the present invention.

FIG. 17 is a plan diagram schematically showing the configuration of a main portion of a sub-pixel 100 on the liquid crystal display panel in the liquid crystal display device according to the present invention. In addition, FIG. 18 is a cross sectional diagram schematically showing the configuration of a main portion of a sub-pixel 100 on the liquid crystal display panel in the liquid crystal display device according to the present invention, and a schematic cross sectional diagram along line A-A' in FIG. 17 showing the structure.

In the present embodiment, a reflective layer 130 and a polarization layer 150 are selectively provided between the slits in the pixel electrodes 191 and the data lines 7 provided on the second transparent substrate 111 as in the third embodiment. That is to say, an additional reflection area is provided where the slits in the pixel electrode 191 and the data line 7 overlap as viewed in a direction perpendicular to the surface of the substrate that forms the liquid crystal display panel 1. The structure of the rest is the same as in the liquid crystal display device according to the third embodiment, and therefore, the same symbols are attached to components having the same function, and the descriptions are not repeated.

The width of the reflection area that overlaps with the slits in the pixel electrodes 191 and the data lines 7 is greater than that of the slits in the pixel electrodes 191 and the data lines 7, so that the slits in the pixel electrodes 191 and the data lines 7 are completely covered in the configuration. At this time, it is desirable for the reflection area which overlaps with the slits in the pixel electrodes 191 and the data lines 7 to keep a constant distance from the reflection area that overlaps with the protrusions of the common electrodes 220. That is to say, it is desirable for the reflection area that overlaps with the slits in the pixel electrodes 191 and the data lines 7 to be in zigzag form with the same bend angle as the data lines 7 and a width which allows a constant distance to be kept from the reflection area which overlaps with the protrusions of the common electrode 220.

In the present embodiment also, a bright VA system liquid crystal display device having a high contrast ratio and a wide viewing angle can be implemented, as in the above described third embodiment.

Particularly in the present embodiment, the slits in the pixel electrodes 191 and the data lines 7 overlap with the reflection area. That is to say, the slits in the pixel electrodes 191 and the data lines 7 which do not contribute to the brightness in the transmissive display can overlap efficiently with the reflection area which does not initially contribute to the transmissive display. Therefore, barely any brightness is lost in the transmissive display and it can be used for reflection display, and thus, such effects can be gained that brighter display is possible.

In addition, the reflection area overlaps with the gate lines 7, and thus, the contrast ratio can be prevented from lowering due to external light reflecting from the data lines 7 in bright environments. Furthermore, the reflection area overlaps with the gate lines 7 which do not contribute to the display, so that it can be used for the reflection display, and therefore, such effects can be gained that brighter reflection display is possible.

Though in the present embodiment, slits are provided in the pixel electrodes and protrusions are provided on the common electrodes, the effects of the present invention can be gained also in the case where protrusions are provided on the pixel electrodes and slits are provided in the common electrodes.

The invention claimed is:

1. A liquid crystal display device, comprising:
    a number of data lines;
    gate lines formed so as to cross said number of data lines;
    a number of switching elements formed in locations where said number of data lines and said number of gate lines cross;
    a reflection area and a transmission area formed within each pixel;
    a liquid crystal layer sandwiched between first and second substrates;
    a common electrode placed between said first substrate and said liquid crystal layer; and
    a pixel electrode placed between said second substrate and said liquid crystal layer, characterized in that:
    said common electrode has slits or protrusions,
    said data lines overlap the slits in said common electrode or protrusions of said common electrode in a direction normal to a surface of said first substrate,
    the slits in said common electrode or the protrusion of said common electrode are bent, and
    said data lines are bent and are provided so as to cross a number of adjacent pixels.

2. The liquid crystal display device according to claim 1, characterized in that:
    the width of said data lines is greater than the width of the slits in said common electrode or the width of the protrusions of said common electrode, and
    said data lines are provided so as to correspond to the slits in said common electrode or the protrusions of said common electrode in the direction normal to a surface of said first substrate so that the bend in said data line corresponds to the bend in said slits or in said protrusions.

3. The liquid crystal display device according to claim 1, characterized in that:
    said pixel electrode has slits or protrusions, and
    said reflective layer overlaps the slits in said pixel electrode or the protrusions of said pixel electrode in the direction normal to a surface of said first substrate.

4. The liquid crystal display device according to claim 1, characterized by further comprising:
    a reflective layer provided between said second substrate and said pixel electrode in said reflection area; and
    a polarization layer provided between said reflective layer and said pixel electrode in said reflection area.

5. The liquid crystal display device according to claim 1, characterized that:
    a polarization layer is provided between said second substrate and said pixel electrode in said transmission area.

6. The liquid crystal display device according to claim 1, characterized that:
    the width of said reflective layer provided between said data lines and the slits in said common electrode or the protrusions of said common electrode is greater than the width of said data lines and the width of the slits in said common electrode or the width of said data lines and the width of the protrusions of said common electrode.

7. The liquid crystal display device according to claim 1, characterized in that:
    said transmission area is divided into a number of portions within each pixel.

8. The liquid crystal display device according to claim 1, characterized in that:
    said data lines are provided so as to correspond to the slits in said common electrode or the protrusions of said common electrode in the direction normal to a surface of said first substrate so that the bend in said data line corresponds to the bend in said slit or in said protrusions.

9. A liquid crystal display device, comprising:
a number of data lines;
gate lines formed so as to cross said number of data lines;
a number of switching elements formed in locations where said number of data lines and said number of gate lines cross;
a reflection area and a transmission area formed within each pixel;
a liquid crystal layer sandwiched between first and second substrates;
a common electrode placed between said first substrate and said liquid crystal layer; and
a pixel electrode placed between said second substrate and said liquid crystal layer, characterized in that:
said pixel electrode has slits or protrusions,
said data lines overlap the slits in said pixel electrode or protrusions of said pixel electrode in a direction normal to a surface of said first substrate,
the slits in said pixel electrode or the protrusion of said pixel electrode are bent, and
said data lines are bent and are provided so as to cross a number of adjacent pixels.

10. The liquid crystal display device according to claim 9, characterized in that
the width of said data lines is greater than the width of the slits in said pixel electrode or the width of the protrusions of said pixel electrode, and
said data lines are provided so as to correspond to the slits in said pixel electrode or the protrusions of said pixel electrode in the direction normal to a surface of said first substrate so that the bend in said data line corresponds to the bend in said slits or in said protrusions.

11. The liquid crystal display device according to claim 9, characterized by further comprising:
a reflective layer provided between said second substrate and said pixel electrode in said reflection area; and
a polarization layer provided between said reflective layer and said pixel electrode in said reflection area.

12. The liquid crystal display device according to claim 9, characterized in that:
the width of said reflective layer provided between said data lines and the slits in said pixel electrode or the protrusions of said pixel electrode is greater than the width of said data lines and the width of the slits in said pixel electrode or the width of said data lines and the width of the protrusions of said pixel electrode.

13. The liquid crystal display device according to claim 9, characterized in that:
said data lines are provided so as to correspond to the slits in said pixel electrode or the protrusions of said pixel electrode in the direction normal to a surface of said first substrate.

14. A liquid crystal display device, comprising:
a number of data lines;
gate lines formed so as to cross said number of data lines;
a number of switching elements formed in locations where said number of data lines and said number of gate lines cross;
a reflection area and a transmission area formed within each pixel;
a liquid crystal layer sandwiched between first and second substrates;
a common electrode placed between said first substrate and said liquid crystal layer; and
a pixel electrode placed between said second substrate and said liquid crystal layer, characterized in that:
said common electrode has protrusions,
said pixel electrode has slits,
said data lines overlap the slits in said pixel electrode in a direction normal to a surface of said first substrate,
said reflective layer overlaps the protrusions of said common electrode in the direction normal to the surface of said first substrate,
the slits in said pixel electrode are bent, and
said data lines are bent and are provided so as to cross a number of adjacent pixels.

15. The liquid crystal display device according to claim 14, characterized in that:
the width of said data lines is greater than the width of the slits in said pixel electrode, and
said data lines are provided so as to correspond to the slits in said pixel electrode in the direction of normal to a surface of said first substrate, so that the bend in said data lines corresponds to the bend in said slits.

16. The liquid crystal display device according to claim 8, characterized by further comprising:
a reflective layer provided between said second substrate and said pixel electrode in said reflection area; and
a polarization layer provided between said reflective layer and said pixel electrode in said reflection area; and
said data lines are provided in the center portion within said pixels.

17. The liquid crystal display device according to claim 14, characterized in that:
said data lines are provided so as to correspond to the slits in said pixel electrode in the direction of normal to a surface of said first substrate such that the bend in said data lines corresponds to the bend in said slits.

18. A liquid crystal display device comprising:
a number of data lines;
gate lines formed so as to cross said number of data lines;
a number of switching elements formed in locations where said number of data lines and said number of gate lines cross:
a reflection area and a transmission area formed within each pixel;
a liquid crystal layer sandwiched between first and second substrates;
a common electrode placed between said first substrate and said liquid crystal layer; and
a pixel electrode placed between said second substrate and said liquid crystal layer characterized in that:
said common electrode has slits or protrusions,
said data lines overlap the slits in said common electrode or protrusions of said common electrode in a direction normal to a surface of said first substrate,
said data lines are provided in the center portion within said pixels, and
said reflection area is formed in two portions within one pixel such that said two portions of said reflection area divide said transmission area into three parts.

19. A liquid crystal display device comprising:
a number of data lines;
gate lines formed so as to cross said number of data lines;
a number of switching elements formed in locations where said number of data lines and said number of gate lines cross;
a reflection area and a transmission area formed within each pixel;
a liquid crystal layer sandwiched between first and second substrates;

a common electrode placed between said first substrate and
said liquid crystal layers; and
a pixel electrode placed between said second substrate and
said liquid crystal layer, characterized in that
said pixel electrode has slits or protrusions,
said data lines overlap the slits in said pixel electrode or
protrusions of said pixel electrode in a direction normal
to a surface of said first substrate, said data lines are provided in the center portion within said
pixels, and
said reflection area is formed in two portions within one
pixel such that said two portions of said reflection area
divide said transmission area into three parts.

* * * * *